United States Patent
Kano et al.

[11] Patent Number: 5,864,064
[45] Date of Patent: Jan. 26, 1999

[54] ACCELERATION SENSOR HAVING COAXIALLY-ARRANGED FIXED ELECTRODE AND MOVABLE ELECTRODE

[75] Inventors: Kazuhiko Kano, Toyoake; Yoshinori Ohtsuka, Okazaki; Norio Kitao, Nukata-gun; Kenichi Ao, Tokai; Yasutoshi Suzuki, Okaszaki, all of Japan

[73] Assignee: Nippondenso Co., LTD., Kariya, Japan

[21] Appl. No.: 717,405

[22] Filed: Sep. 20, 1996

[30] Foreign Application Priority Data

Sep. 22, 1995 [JP] Japan .................................. 07-244306
Aug. 30, 1996 [JP] Japan .................................. 08-230769

[51] Int. Cl.$^6$ ........................................ G01P 15/00
[52] U.S. Cl. .............................. 073/514.36; 073/514.38; 073/514.32
[58] Field of Search ............................ 73/514.01, 514.16, 73/514.32, 514.36, 514.38; 200/61.45 R, 61.52; 361/280; 340/669, 686, 689

[56] References Cited

U.S. PATENT DOCUMENTS

| 5,396,223 | 3/1995 | Iwabuchi et al. ..................... 340/690 |
| 5,524,489 | 6/1996 | Twigg .................................. 73/514.38 |

FOREIGN PATENT DOCUMENTS

| 50-019154 | 6/1975 | Japan . |
| 58-062425 | 4/1983 | Japan . |
| 62-174978 | 7/1987 | Japan . |
| 6-123631 | 5/1994 | Japan . |
| 6-123632 | 5/1994 | Japan . |
| 6-163938 | 6/1994 | Japan . |
| 8-021722 | 3/1996 | Japan . |

*Primary Examiner*—Hezron Williams
*Assistant Examiner*—Richard A. Moller
*Attorney, Agent, or Firm*—Pillsbury Madison & Sutro LLP

[57] ABSTRACT

An acceleration sensor is constructed by a substrate, a cylindrical dead-weight movable electrode to be displaced by acceleration, a fixed electrode from the inside of which a cylinder is hollowed, a cylindrical anchor arranged on the substrate for supporting the dead-weight movable electrode with elastic transformable structural material and beams. When acceleration is applied from the outside, the cylindrical detecting face of the dead-weight movable electrode and the cylindrical detected face of the fixed electrode are in contact on a two-dimensional plane parallel to the substrate and the acceleration sensor detects the contact. A radial interval between the detecting face of the dead-weight movable electrode and the detected face of the fixed electrode is set in view of the elastic modulus of the beams so that external force can be detected isotropically and the acceleration sensor detects acceleration on a two-dimensional plane nondirectionally.

48 Claims, 14 Drawing Sheets

ACCELERATION SENSOR HAVING COAXIALLY-ARRANGED FIXED ELECTRODE AND MOVABLE ELECTRODE

BACKGROUND OF THE INVENTION

1. Field of the Invention

The present invention relates to an acceleration sensor for sensing earthquake vibrations and others, and particularly to such a sensor which detects accelerations in many directions on a two-dimensional plane at approximately the same sensitivity and may be built in a gas or other flow meter so as to shut off the valve of a gas pipe.

2. Description of Related Art

As a conventional type acceleration sensor, an acceleration sensor disclosed in Japanese examined utility model publication No. Sho 50-19154 and a dynamic quantity sensor for detecting dynamic quantity such as angular velocity and acceleration which is disclosed in Japanese unexamined patent publications No. Hei 6-123631 and No. Hei 6-123632 are well-known.

The acceleration sensor disclosed in Japanese examined utility model publication No. Sho 50-19154 is formed by assembling an anchor displaced depending upon applied acceleration, a beam for supporting the anchor and a fixed electrode for detecting contact with the anchor which are respectively made of metallic material by machining. However, this acceleration sensor needs a troublesome assembly work of each member, size reduction is difficult and it is unsuitable for mass production.

A semiconductor dynamic quantity sensor disclosed in Japanese unexamined patent publications No. Hei 6-123631 and No. Hei 6-123632 can detect dynamic quantity of the low level of acceleration and a frequency with high precision, difficulty in assembling each member is obviated because each member is formed in the same semiconductor process and it is regarded as promising because it can be manufactured at a low price and is suitable for mass production.

This semiconductor dynamic quantity sensor detects changes of capacitance between movable electrodes which are moved together with an anchor supported by four beams so that it can be moved in two directions of X and Y, and fixed electrodes which are provided on the side of a substrate so as to measure acceleration. This sensor can detect acceleration in all directions on an X-Y plane by calculating the magnitude of acceleration detected in each direction of X and Y.

However, an arithmetic circuit for processing a signal synthesization based upon each result of detection in the directions of X and Y is required to detect the magnitude of acceleration in the diagonal direction on the X-Y plane, thus complicating signal processing circuit.

SUMMARY OF THE INVENTION

The object of the present invention is to provide an acceleration sensor which can detect acceleration in many directions on a plane at approximately the same, sensitivity and can be constructed compactly and simply without requiring a signal synthesization process based upon each result of detection of acceleration.

According to a first aspect of the present invention, when a dead-weight (i.e., weighted) movable electrode supported by beams receives acceleration externally, it is displaced in the direction approximately parallel to the surface of a substrate and the distance between a detecting face of the dead-weight movable electrode and the detected face of a fixed electrode varies. In this case, the detecting face of the dead-weight movable electrode and the detected face of the fixed electrode are constructed on the approximately cylindrical sides so that they are opposite. Therefore, even if acceleration is applied from any direction approximately parallel to the surface of the substrate, the detecting face and the detected face can be brought close by approximately the same quantity as the magnitude of the acceleration. Thus, acceleration can be detected isotropically. As the distance between the detecting face of the dead-weight movable electrode and the detected face of the fixed electrode has only to be detected by a single detecting member, a special arithmetic circuit is not required even if acceleration is applied diagonally relative to the directions of X and Y and the sensor can be constructed simply. As the anchor, the beam and the dead-weight movable electrode are integrated by the same material, the assembly of the anchor, the beam and the dead-weight movable electrode is not required.

According to a second aspect of the present invention, in addition to the first aspect, a second detecting element detects changes of second distance after the first detecting element detects an acceleration larger than a predetermined magnitude. Therefore, power consumed in a second detecting circuit can be reduced.

Preferably, the first sensor is constructed in a switch type and the second sensor is constructed in a capacitive type. The two sensors are formed by a semiconductor and mounted on the same substrate.

BRIEF DESCRIPTION OF THE DRAWINGS

Other objects, features and advantages of the present invention will be made more apparent by the following detailed description when read with reference to the accompanying drawings, in which.

DETAILED DESCRIPTION OF PRESENTLY PREFERRED EMBODIMENTS

The present invention will be described in more detail with reference to various embodiments with reference to the accompanying drawings.

(First Embodiment)

Figure 1:
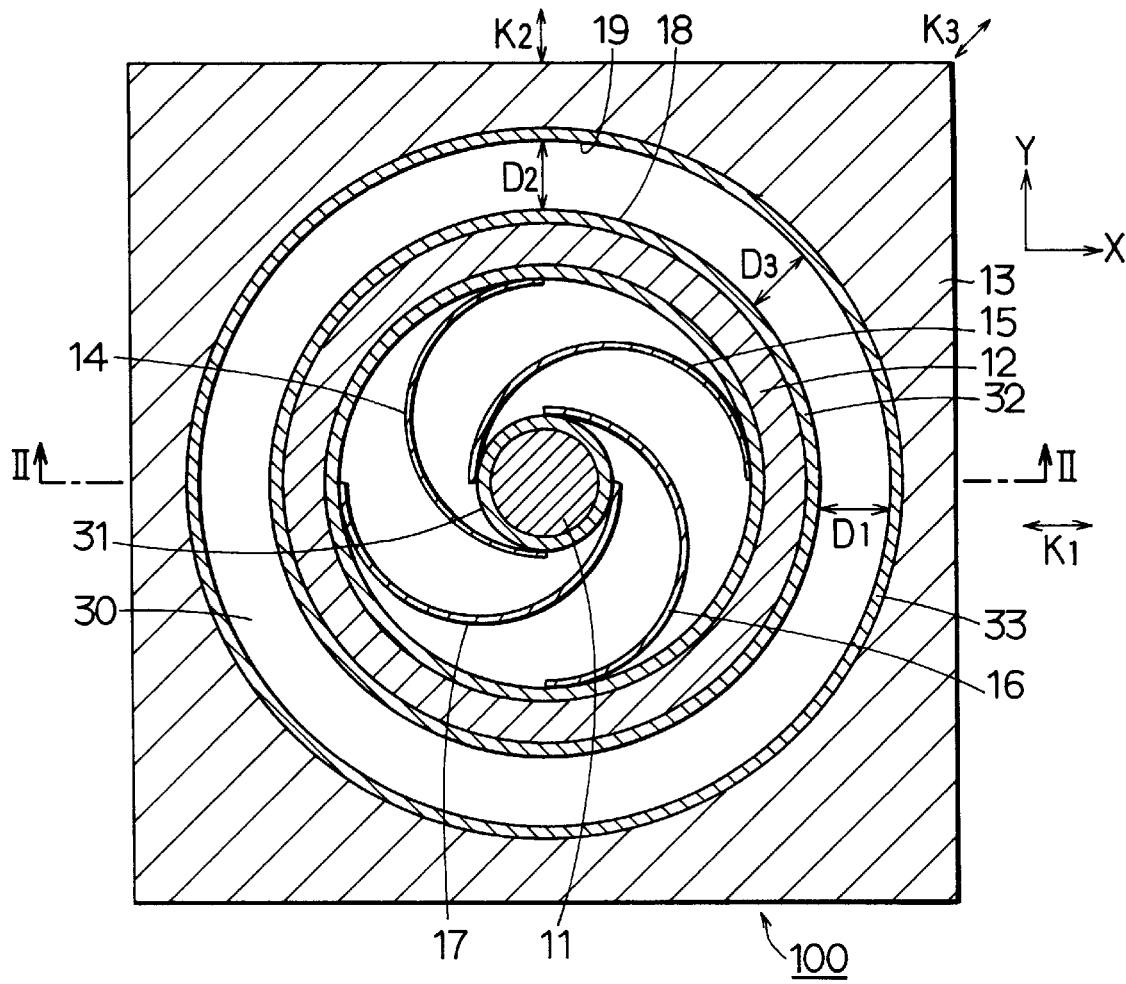
FIG. 1 is a cross section showing an acceleration sensor according to a first embodiment of the present invention.
Figure 2:
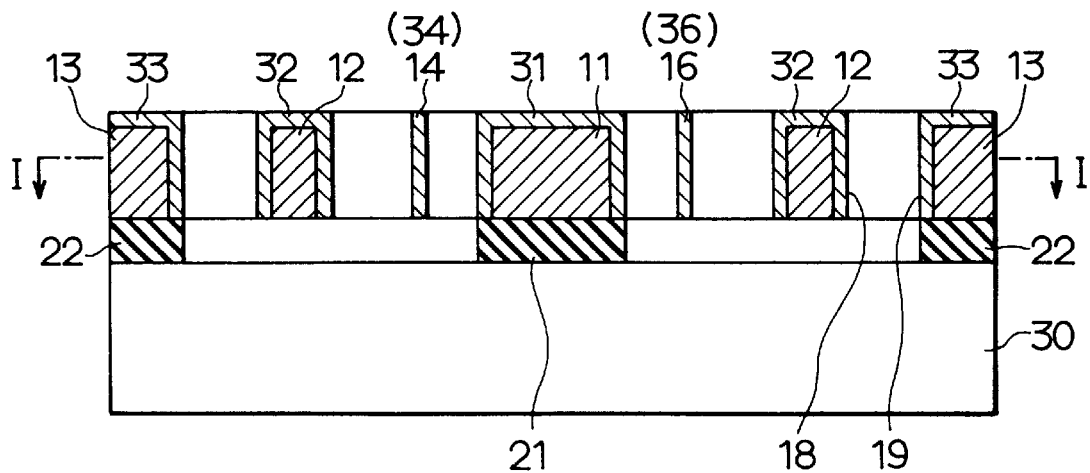
FIG. 2 is a sectional view viewed along the line II—II of the acceleration sensor shown in FIG. 1.

An acceleration sensor shown in FIGS. 1 and 2 is a switch type acceleration sensor 100 constructed by a substrate 30, an anchor 11 covered with a low resistance layer 31, a dead-weight movable electrode 12 covered with a low resistance layer 32, four spiral beams 14 to 17 and a fixed electrode 13 covered with low resistance layer 33. The movable electrode 12 and the fixed electrodes 13 are arranged coaxially around the anchor 11.

The substrate 30 is made of a P-type silicon. The anchor 11 is cylindrical, formed approximately in the center on the substrate 30 and supports the dead-weight movable electrode 12 with four beams 14 to 17 which can be transformed elastically approximately in parallel with the surface of the substrate 30. The dead-weight movable electrode 12 is cylindrical, is provided apart from the substrate 30 by a predetermined distance in parallel with it, is supported by the anchor 11 with the four beams 14 to 17 which can be transformed elastically and is displaced depending upon applied acceleration. The conductive detecting face 18 of the dead-weight movable electrode 12 is formed on the approximately cylindrical side in the direction perpendicular to the substrate 30, that is, the cylindrical peripheral face. The four beams 14 to 17 are provided on the anchor 11 in the shape which can be elastically transformed for supporting the dead-weight movable electrode 12. In this embodiment, the length of each beam 14 to 17 is longer than the side in the shape of la cross section so that it can be elastically transformed in approximately parallel to the surface of the substrate 30 and thereby, when each beam is viewed from the top, it is in the shape of a part of an arc. The fixed electrode 13 is in such a shape that the inside of a cylinder is hollowed and is formed on the substrate 30 apart from the dead-weight movable electrode 12 by a predetermined distance outside it. The cylindrical inner face opposite to the detecting face 18 of the dead-weight movable electrode 12 is the conductive detected face 19. Oxide films 21 and 22 are respectively formed on the substrate 30 under the central anchor 11 and the fixed electrode 13 to support the same thereon. A detecting circuit for detecting that the dead-weight movable electrode 12 is displaced by acceleration applied from the outside, and the detecting face 18 of the dead-weight movable electrode and the detected face 19 of the fixed electrode are in contact is provided though it is not shown. The detecting face 18 of the dead-weight movable electrode 12, the detected face 19 of the fixed electrode 13 and this detecting circuit are in continuity via wire. In this embodiment, as the dead-weight movable electrode 12, the beams 14 to 17 and the anchor 11 are all in continuity, the anchor 11 and the detecting circuit may be connected via wire.

The approximately cylindrical side according to the present invention includes the side the inner face of which is approximately cylindrical as the detected face 19 in addition to the side the peripheral face of which is approximately cylindrical as the detecting face 18 shown in FIG. 1.

A predetermined radial interval between the dead-weight movable electrode 12 and the fixed electrode 13 is set so that the relationship between the total elastic modulus (coefficient) ki in each direction (i=1 to n) at intervals of n pieces of beams and the distance Di between the dead-weight movable electrode 12 and the fixed electrode 13 is as follows:

[Expression 1]

$$D1 \times k1 = D2 \times k2 = \ldots = Di \times ki = \ldots = Dn \times kn.$$

Even if acceleration is generated in any direction (i=1 to n) on a plane parallel to the substrate 30 by arranging the beams 14 to 17 as described above, the acceleration can be isotropically detected. Referring to FIG. 1, if predetermined intervals are D1 (the direction of X in FIG. 1), D2 (the direction of Y) and D3 (a diagonal direction, that is, the direction of 45°) and the total elastic modulus of four beams 14 to 17 in the direction of each interval is respectively k1, k2 and k3, the respective intervals D1, D2 and D3 are as follows to detect acceleration F isotropically on a plane parallel to the substrate 30:

[Expression 2]

$$D1 = F/k1$$

[Expression 3]

$$D2 = F/k2$$

[Expression 4]

$$D3 = F/k3.$$

If k1, k2 and k3 are all equal when D1, D2 and D3 are set so that they meet the expression 1, D1, D2 and D3 are all equal. In this embodiment, intervals are set so that they meet the expression 1 as described above, the dead-weight movable electrode 12 is cylindrical and the fixed electrode 13 is formed by hollowing out a cylinder. The acceleration sensor 100 is formed so that it is symmetrical both vertically and horizontally.

Impurities are doped into the respective surfaces of the anchor 11, four beams 14 to 17, the dead-weight movable electrode 12 and the fixed electrode 13 by a method such as ion implantation and the deposition of phosphorus so as to reduce the resistivity of the structure.

Next, the manufacturing process of the acceleration sensor 100 will be described below referring to FIGS. 3 to 6.

Figure 3:
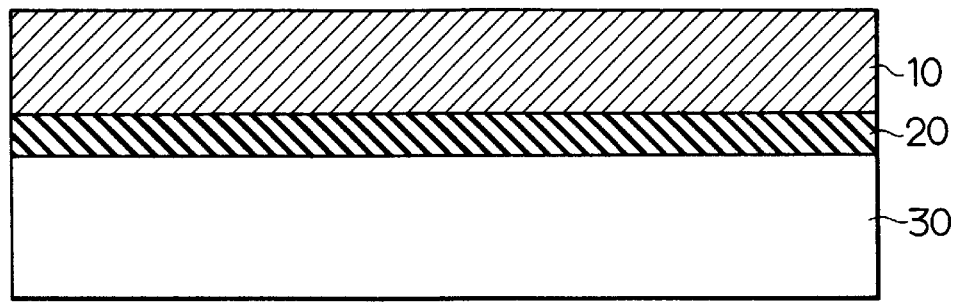
FIGS. 3 to 6 show processes for manufacturing the acceleration sensor shown in FIG. 1.

As shown in FIG. 3, an oxide film 20 is first formed on the substrate 30 and a silicon film 10 is formed on the oxide film 20. A silicon-on-insulator (SOI) substrate may be used in place of the substrate 30 shown in FIG. 3.

Figure 4:
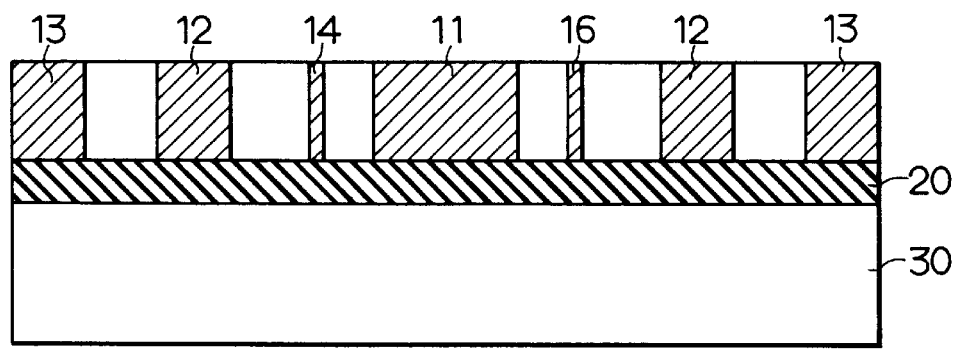

Next, as shown in FIG. 4, the silicon film 10 is etched and the anchor 11, the beams 14 and 16, the dead-weight movable electrode 12 and the fixed electrode 13 are formed in predetermined shapes.

Figure 5:
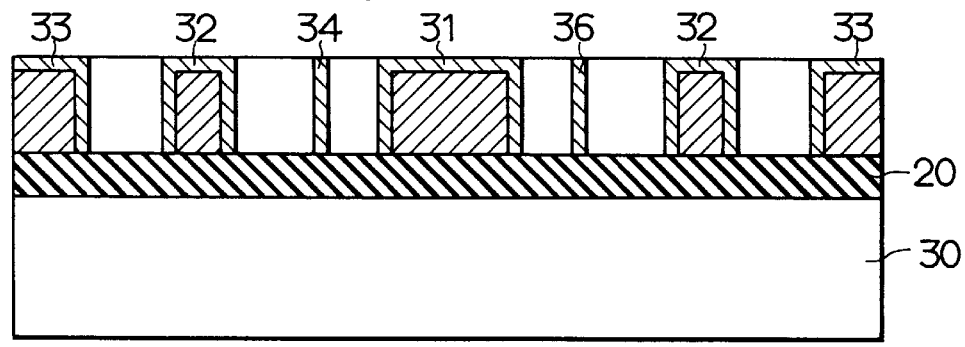

Next, as shown in FIG. 5, impurities are doped into the anchor 11, the beams 14 and 16, the dead-weight movable electrode 12 and the fixed electrode 13 so as to apply conductance to the surface of silicon. The method of doping impurities includes ion implantation and the deposition of phosphorus. In the case of ion implantation, afterward, heat treatment for activating doped impurities is required. FIG. 5 is a sectional view after impurities are doped and low resistance layers 31, 32, 33, 34 and 36 are formed on the surface of each part.

Figure 6:
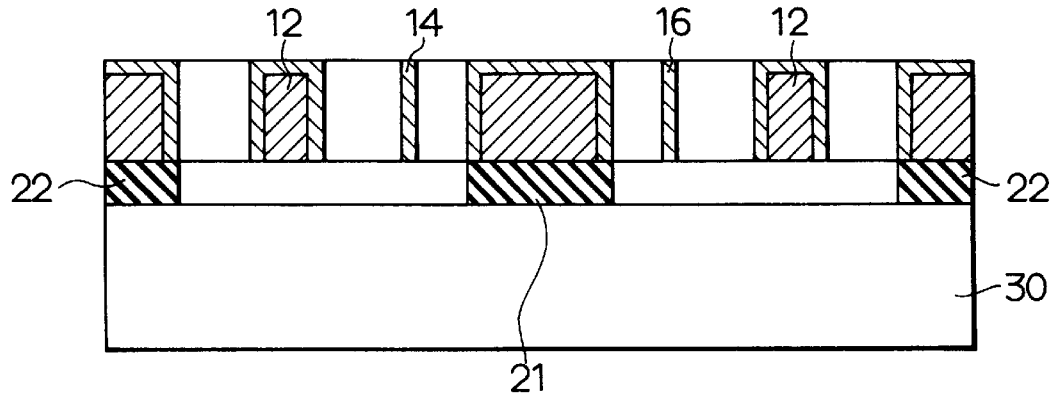

Finally, as shown in FIG. 6, the movable parts are formed by etching the oxide film 20 immediately under the dead-weight movable electrode 12 and the beams 14 to 17 by hydrogen fluoride.

In FIGS. 3 to 6, the manufacturing process of the acceleration sensor 100 using a P-type silicon substrate is described above. However, an acceleration sensor may be also manufactured in the following process using a glass substrate.

Figure 7:
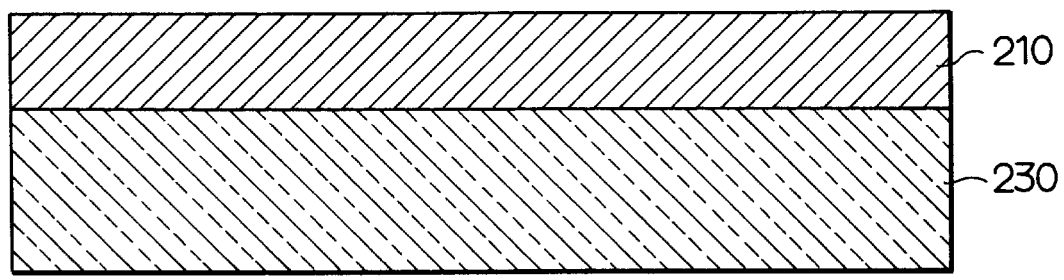
FIGS. 7 to 9 show manufacturing processes of the acceleration sensor when the substrate is made of glass.

First, as shown in FIG. 7, for example a Pyrex glass substrate 230 (Pyrex: trade name) and a silicon substrate 210 with low resistance are joined in an anode process. At this time, the surface of the silicon substrate 210 may be polished or the silicon substrate may be thinned by etching if necessary.

Figure 8:
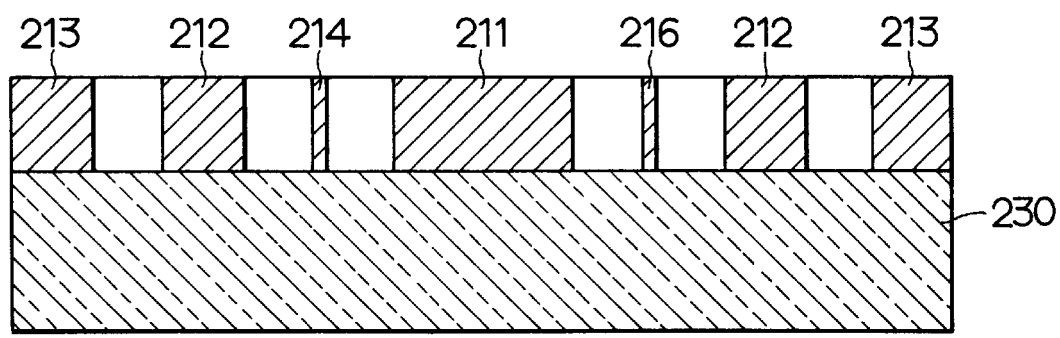

Next, as shown in FIG. 8, the silicon substrate 210 is etched so that an anchor 211, beams 214 and 216, a dead-weight movable electrode 212 and a fixed electrode 213 are in predetermined shapes.

Figure 9:
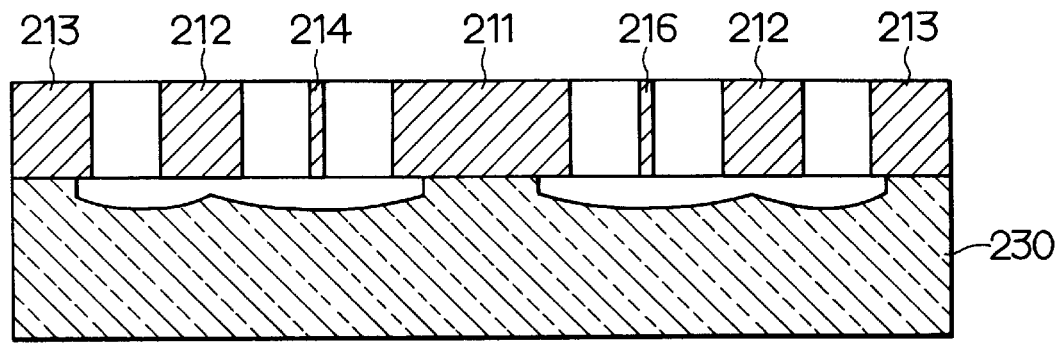

Finally, as shown in FIG. 9, a movable part is formed by etching the Pyrex glass substrate 230 immediately under the dead-weight movable electrode 212 and the beams 214 and 216 by hydrogen fluoride. In this case, a Pyrex glass substrate is used, however, a glass substrate is not limited to Pyrex and any glass substrate which can be joined to a silicon substrate in an anode process and can be etched by hydrogen fluoride may be used.

Figure 10A:
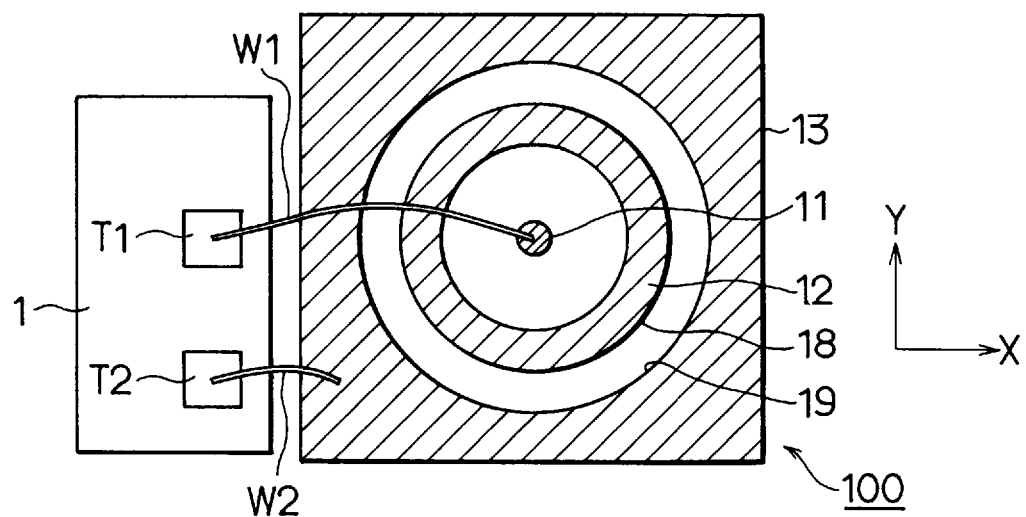
FIGS. 10A to 10C are top views for explaining the operation of the acceleration sensor shown in FIG. 1.
Figure 10B:
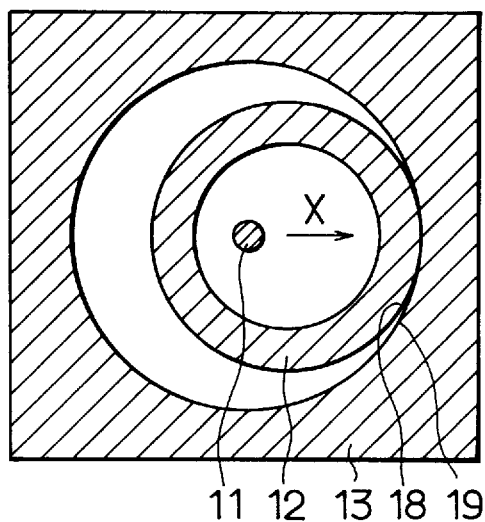

Next, referring to FIGS. 10A to 10C, the operation of a switch type acceleration sensor 100 will be described. Here, beams 14 to 17 for connecting the anchor 11 and a dead-weight movable electrode 12 are omitted for brevity.

In case acceleration is not applied to this sensor, the dead-weight movable electrode 12 is stationary apart from a fixed electrode 13 by predetermined distance. It is desirable to detect acceleration isotropically that this predetermined distance is set so that it meets the expression 1 in view of the elastic modulus of the beams. As shown in FIG. 10A, the terminals T1 and T2 of a detecting circuit 1 are respectively connected to the anchor 11 and the fixed electrode 13 via wires W1 and W2. Potential difference is provided between the terminals T1 and T2 in the detecting circuit. When acceleration is applied to this sensor and the dead-weight movable electrode 12 is displaced in the direction of an X-axis as shown in FIG. 10B, the interval between the dead-weight movable electrode 12 and the fixed electrode 13 is reduced and when acceleration larger than a predetermined magnitude is applied, the detecting face 18 of the dead-weight movable electrode 12 and the detected face 19 of the fixed electrode 13 are in contact on the X-axis. At this time, as potential difference is set between the dead-weight movable electrode 12 and the fixed electrode 13, current flows and hereby, the detecting circuit 1 can detect the contact.

As described above, only if acceleration larger than fixed one functioning as a switch is applied, the dead-weight movable electrode 12 and the fixed electrode 13 are electrified and this operates as the acceleration sensor. That is, the interval in which the dead-weight movable electrode 12 and the fixed electrode 13 are in contact if fixed acceleration in in-plane directions is applied is set between the dead-weight movable electrode 12 and the fixed electrode 13. Therefore, as the shape of the detecting face 18 of the dead-weight movable electrode 12 and the detected face 19 of the fixed electrode 13 are both cylindrical and springs formed by the beams 14 to 17 have an isotropic spring constant to in-plane directions, acceleration can be evenly detected on a plane parallel to the surface of the substrate 30.

Figure 10C:
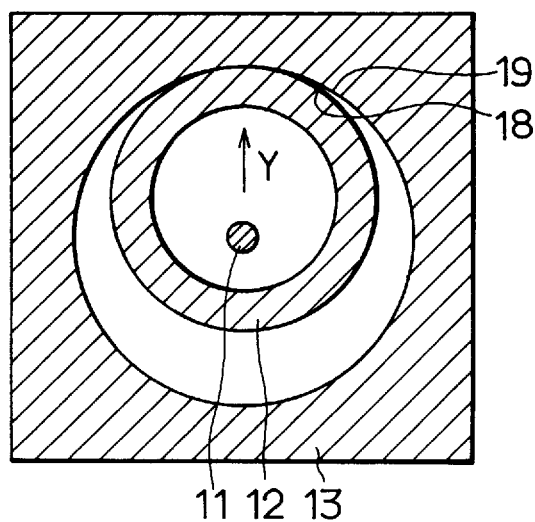

As shown in FIG. 10C, even if acceleration is applied to the dead-weight movable electrode 12 and the electrode is displaced in the direction of Y, similarly the dead-weight movable electrode 12 and the fixed electrode 13 are in contact and current flows between them. Further, even if the dead-weight movable electrode is displaced diagonally on a plane parallel to the surface of the substrate 30 differently from the directions of X and Y, similarly it can be detected that the dead-weight movable electrode 12 and the fixed electrode 13 are in contact.

The following construction may be adopted so that the contact between the dead-weight movable electrode 12 and the fixed electrode 13 is suitable.

Figure 11:
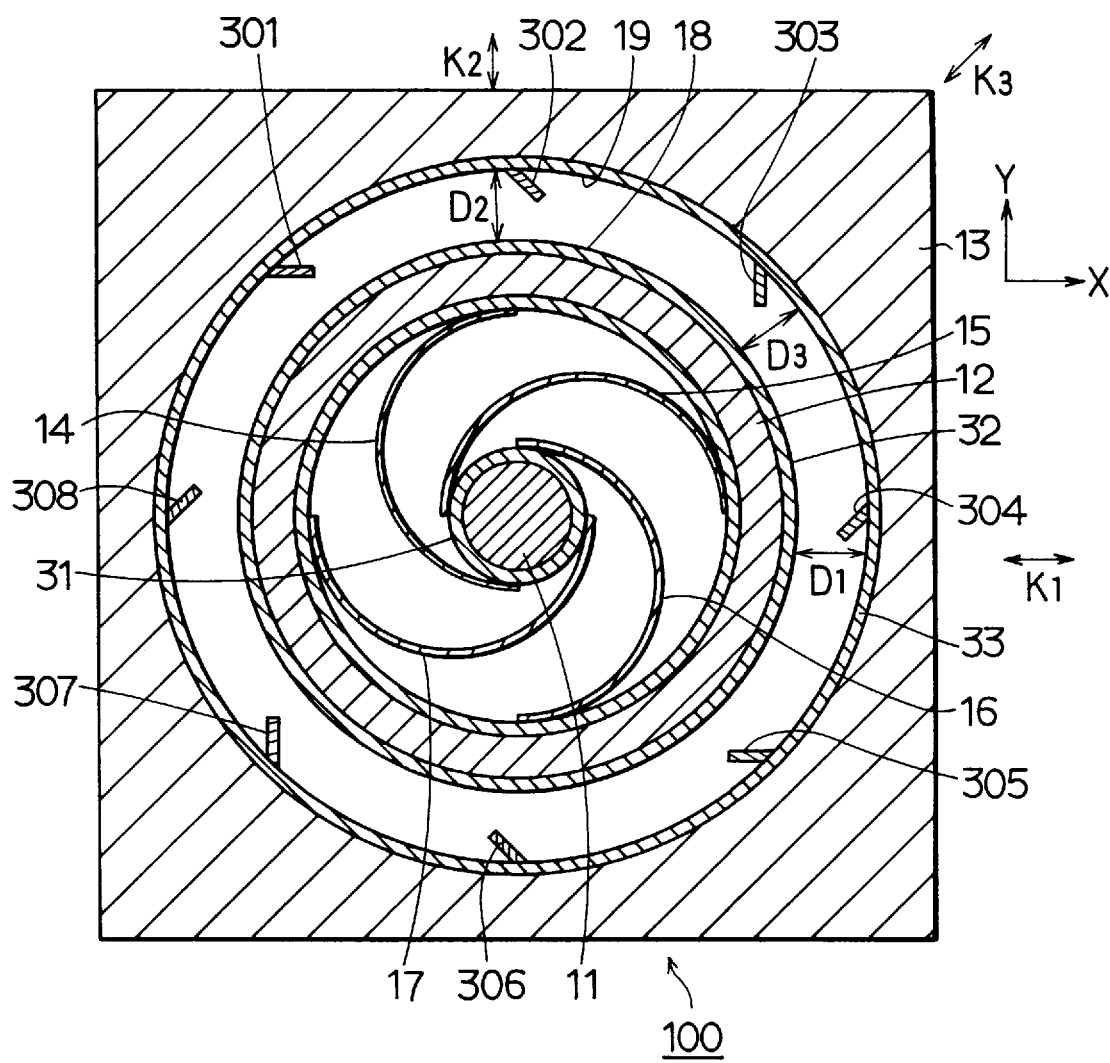
FIG. 11 shows projections provided on a fixed electrode side.

That is, as shown in FIG. 11, projections 301 to 308 are provided on the side of the fixed electrode 13 to tilt toward the movable electrode 12. Hereby, contact pressure when the dead-weight movable electrode 12 is displaced by acceleration and is in contact with the fixed electrode 13 can be enhanced.

Figure 12:
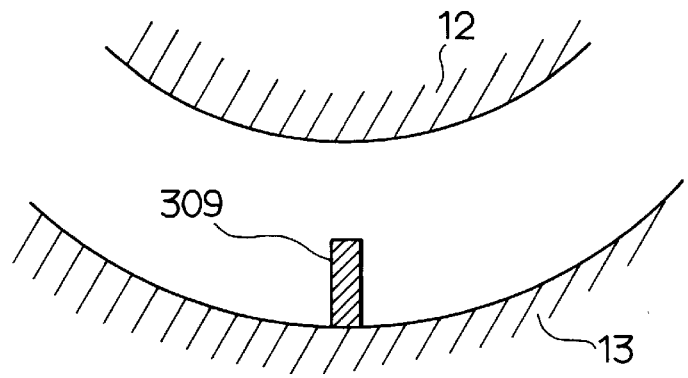
FIGS. 12 to 14 show other forms of projections.
Figure 13:
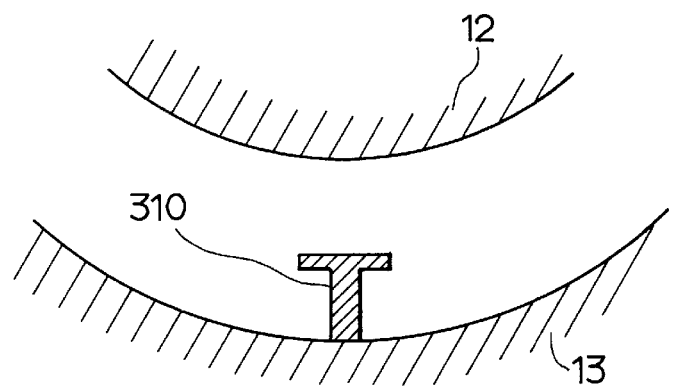
Figure 14:
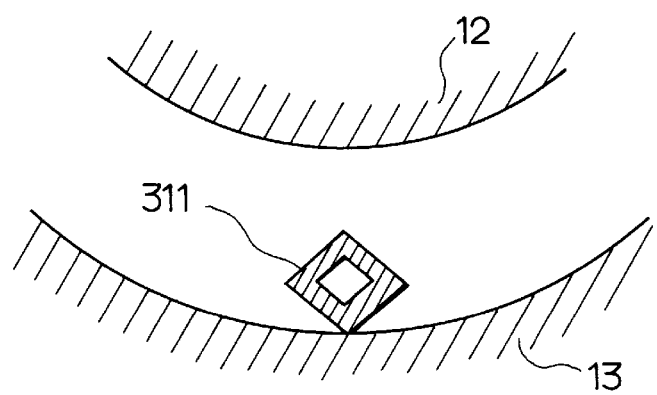

In FIG. 11, the projections tilted apart from the fixed electrode 13 are shown, however, a projection may be also in the shape of a letter I or T or a diamond like a projection 309 shown in FIG. 12, a projection 310 shown in FIG. 13 and a projection 311 shown in FIG. 14, respectively. In this embodiment projections are formed on the side of the fixed electrode 13, however, projections may be also formed on the side of the dead-weight movable electrode 12 and further, on both sides of the movable electrode 12 and the fixed electrode 13.

Figure 15:
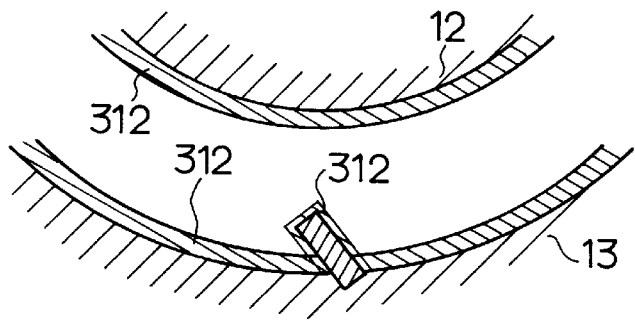
FIGS. 15 to 18 show constructions for reducing contact resistance between the movable electrode and the fixed electrode.
Figure 16:
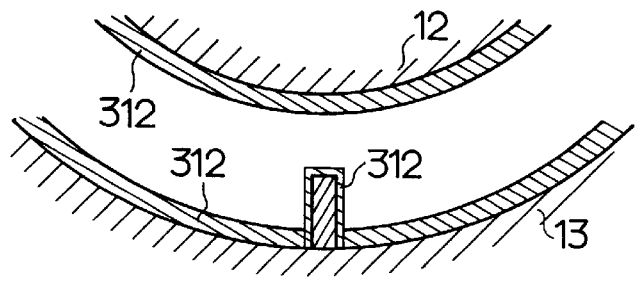
Figure 17:
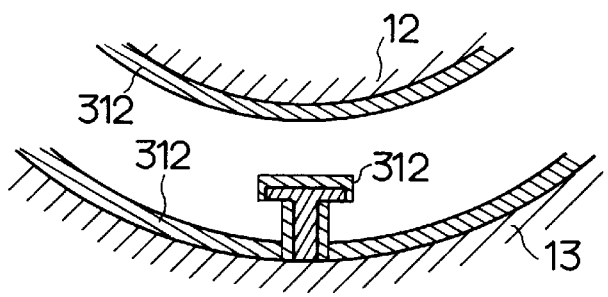
Figure 18:
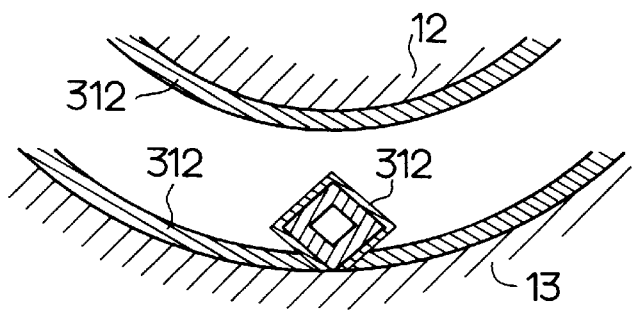

Contact resistance between the dead-weight movable electrode 12 and the fixed electrode 13 can be reduced by forming metal, preferably noble metal 312 such as Au and Pt on the face of the dead-weight movable electrode 12 on the side of the fixed electrode and the face of the fixed electrode 13 on the side of the dead-weight movable electrode as shown in FIG. 15. This surface treatment is similarly performed for projections shown in FIGS. 16 to 18.

This surface treatment is similarly performed even if projections are formed on the side of the dead-weight movable electrode 12 or on both sides of the dead-weight movable electrode 12 and the fixed electrode 13.

As described above, this switch type acceleration sensor 100 can detect acceleration larger than a predetermined value in directions parallel to a plane constructed by the X- and Y- axes at approximately the same sensitivity.

Further, in this embodiment, acceleration can be detected using only one detecting circuit 1 for detecting the contact between the detecting face 18 of the dead-weight movable electrode 12 and the detected face 19 of the fixed electrode 13 and power consumption by the detecting circuit 1 can be reduced.

As described above, in this embodiment, detecting circuits for respective X and Y directions are not required, and even if acceleration is applied diagonally in X and Y directions, a special arithmetic circuit for synthesizing acceleration detected in each direction is not required.

As the dead-weight movable electrode 12 is formed by a circular ring member, the inside and the outside of the circular member can be utilized effectively and the area of the acceleration sensor can be reduced. Moreover, as the anchor 11 is arranged inside the circular member, a special area for arranging the anchor 11 is not required and the area of the acceleration sensor can be reduced.

Therefore, the increase of the area and power consumption can be prevented. As the anchor 11, the beams 14 to 17, the dead-weight movable electrode 12 and the fixed electrode 13 are integrated by the same material, a manufacturing process for assembling each member is not required and the acceleration sensor can be manufactured relatively simply.

That is, as the anchor 11, the beams 14 to 17, the dead-weight movable electrode 12 and the fixed electrode 13 are constructed by the same semiconductor material, they can be formed in the same process in a semiconductor process and further, as the assembly of these parts is not required, the acceleration sensor can be manufactured at a low price. As the anchor 11, the beams 14 to 17, the dead-weight movable electrode 12 and the fixed electrode 13 are constructed by the same conductive semiconductor material and potential difference is provided between the fixed electrode 13 and the dead-weight movable electrode 12 via the anchor 11 and the plural beams 14 to 17 by the detecting circuit 1, wire for connection to the movable part is not required and fatigue failure caused by oscillation seldom occurs.

As the distance between the detecting face 18 and the detected face 19 is kept approximately even when no acceleration is applied, the detecting face 18 and the detected face 19 can be brought close by approximately the same quantity as the magnitude of acceleration even if the acceleration is applied from any direction approximately parallel to the surface of the substrate 30. Thus, acceleration can be isotropically detected.

(Second Embodiment)

Figure 19:
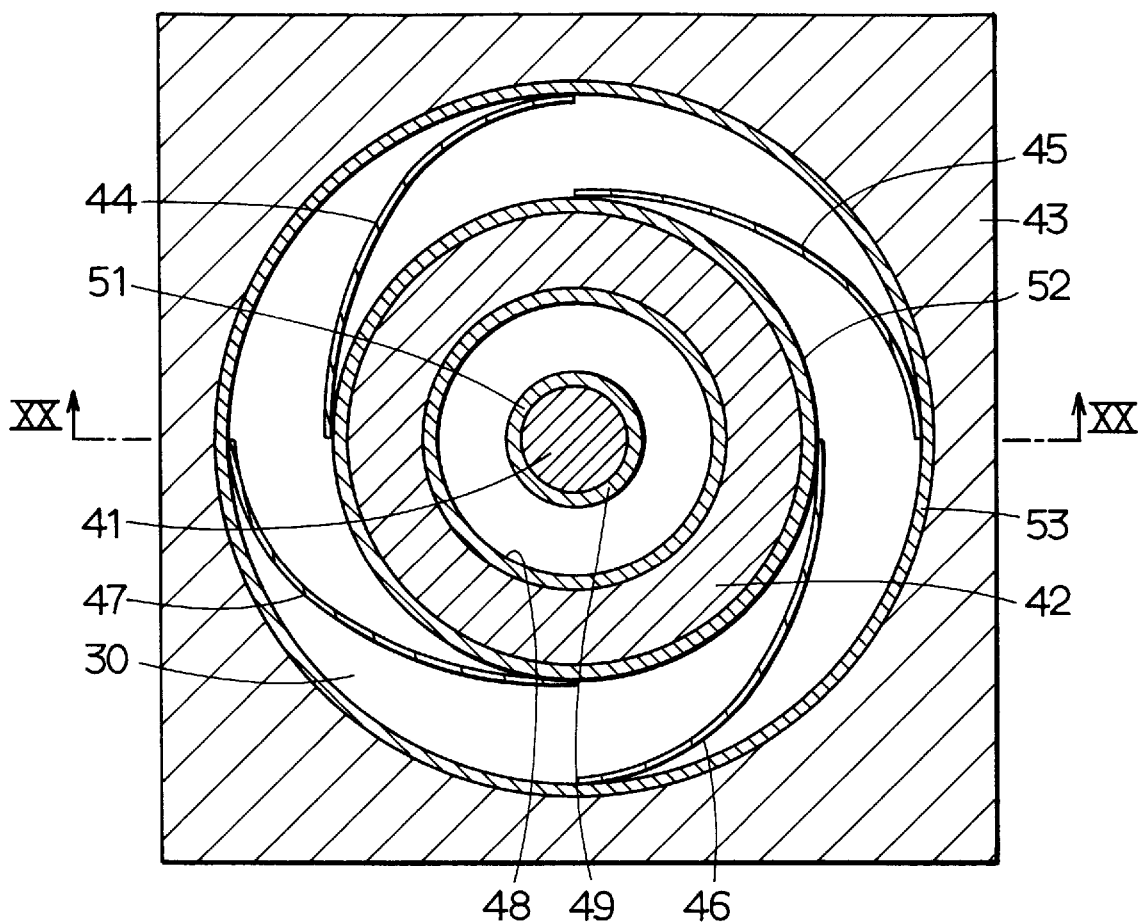
FIG. 19 is a cross section showing an acceleration sensor according to a second embodiment of the present invention.
Figure 20:
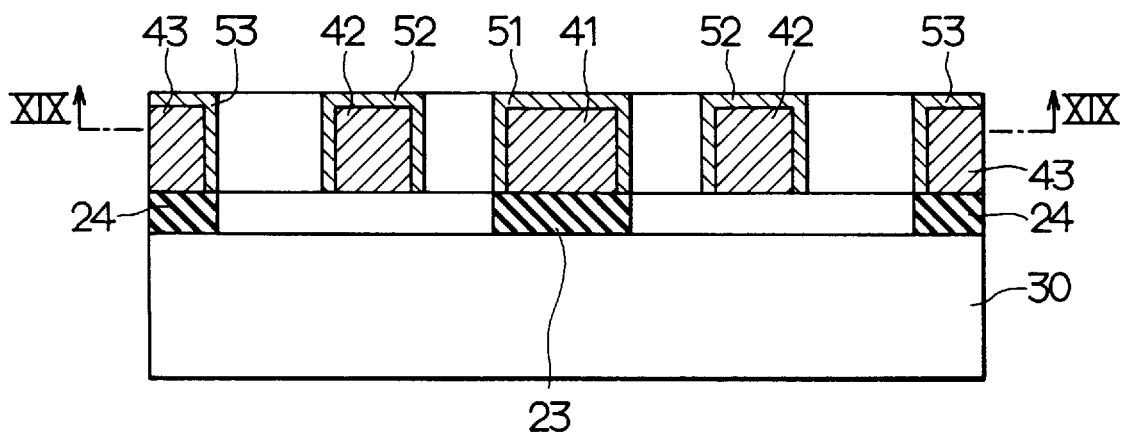
FIG. 20 is a sectional view viewed along the line XX—XX of the acceleration sensor shown in FIG. 19.
Figure 21:
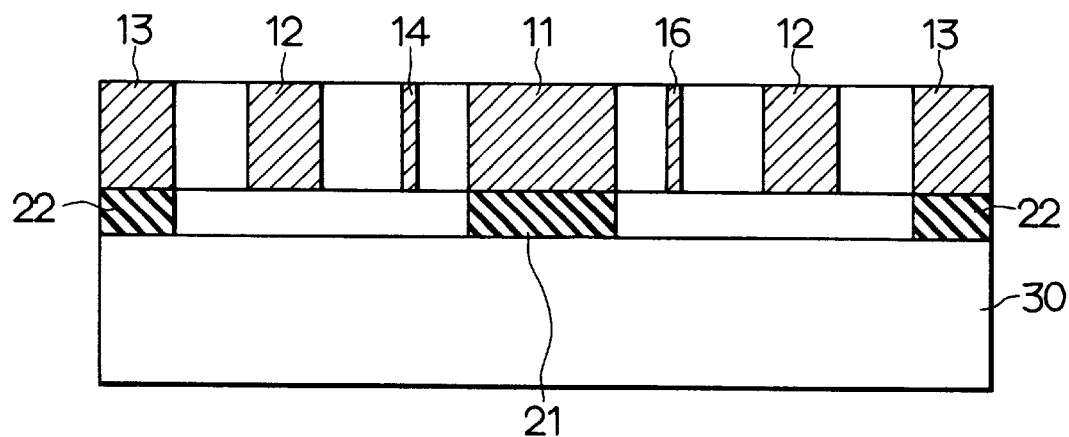
FIG. 21 is a sectional view showing an acceleration sensor according to a third embodiment of the present invention.

An acceleration sensor shown in FIGS. 19 and 20 is constructed by a cylindrical dead-weight movable electrode 42 which is displaced by acceleration, a cylindrical fixed electrode 41 located in the center of a substrate 30, an anchor 43 for supporting the dead-weight movable electrode 42 from the outside and four beams 44 to 47. The cylindrical inner face of the dead-weight movable electrode 42 is a conductive detecting face 48 and the cylindrical peripheral face of the fixed electrode 41 is a conductive detected face 49.

The dead-weight movable electrode 42 is supported by the anchor 43 located apart by a predetermined interval outside the dead-weight movable electrode 42 via the beams 44 to 47 with it apart upward by a predetermined interval from the surface of the substrate 30. The cylindrical fixed electrode 41 is arranged apart by a predetermined interval inside the dead-weight movable electrode 42. Oxide films 23 and 24 are respectively formed under the central fixed electrode 41 and the anchor 43 and are attached on the substrate 30.

Similarly, impurities are doped into the respective surfaces of the fixed electrode 41, the dead-weight movable electrode 42, the anchor 43 and four beams 44 to 47 by a method such as ion implantation and the deposition of phosphorus to reduce the resistivity of the structure and thereby, a low-resistance layer 51 of the fixed electrode 41, a low-resistance layer 52 of the dead-weight movable electrode 42, a low-resistance layer 53 of the anchor and low-resistance layers 54 to 57 of the beams 44 to 47 are formed.

If the position of the fixed electrode 41 is changed from the outside of the dead-weight movable electrode 42 to the inside as described above, an acceleration sensor with beams in the same sectional shape as in the first embodiment shown in FIG. 1 and higher sensitivity can be formed.

As the fixed electrode 41 is arranged inside in addition to the effect produced by the above first embodiment, a special area for arranging the fixed electrode 41 is not required, thereby to reduce the area of the acceleration sensor.

(Third Embodiment)

In a third embodiment, no impurities are doped into the respective surfaces of the anchor 11, the beams 14 to 16, the dead-weight movable electrode 12 and the fixed electrode 13 by a method such as ion implantation and the deposition of phosphorus so as to apply conductance to the structure and to reduce resistivity of the structure. With an SOI substrate 30 provided with low-resistivity joined layers, impurities are not required to be doped into the surface of the structure and the manufacturing process is simplified. Further, if the structure is formed by polysilicon, low-resistivity structure can be obtained by doping impurities, for example P or B when the respective films are formed in addition to the effect produced by the first embodiment and the manufacturing process can be simplified. This structure may be used for the second embodiment as well.

(Fourth Embodiment)

Figure 22:
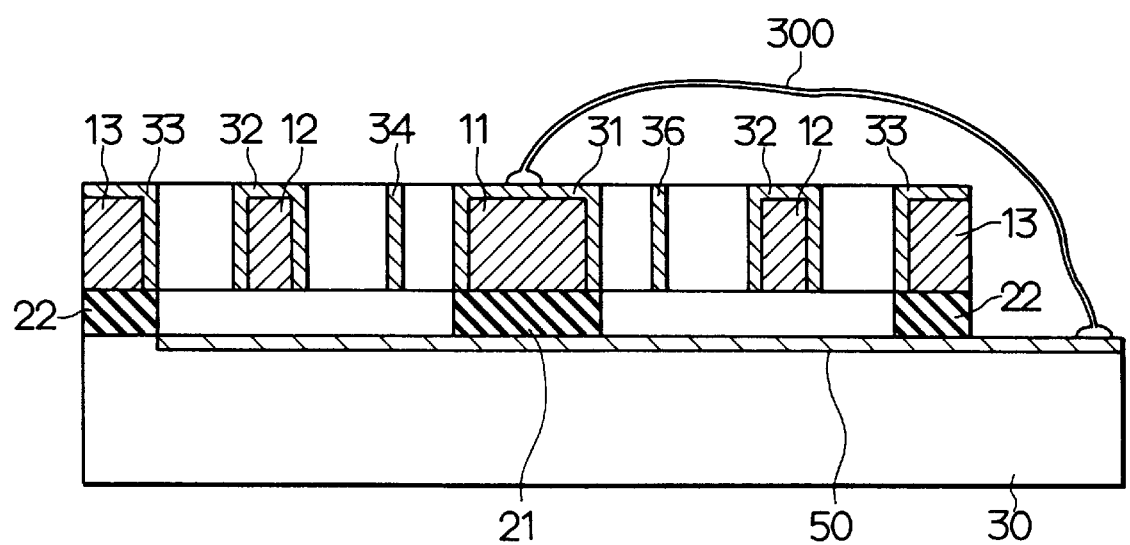
FIG. 22 is a sectional view showing an acceleration sensor according to a fourth embodiment of the present invention.

An acceleration sensor shown in FIG. 22 is constructed by a dead-weight movable electrode 12, an anchor 11, a fixed electrode 13, four beams 14 to 17 and a lower electrode 50.

The lower electrode 50 is made of a diffused layer which is formed by diffusing impurities on a substrate 30 immediately under the movable range of movable structure, that is, the dead-weight movable electrode 12 and the beams 14 to 17.

In an acceleration sensor provided with the movable electrode 12 which is formed apart from the substrate by predetermined distance, potential difference is generated between the dead-weight movable electrode 12 and the substrate 30 by static electricity generated in the manufacturing process. Electrostatic attraction operates between the dead-weight movable electrode 12 and the substrate 30 because of the potential difference and the dead-weight movable electrode 12 may be in contact with the substrate 30 or attracted by the substrate 30. Electrostatic attraction operating between the low-resistance layer 32 of the dead-weight movable electrode and the substrate 30 can be eliminated and the dead-weight movable electrode 12 can be prevented from being displaced on the side of the substrate 30 by providing the lower electrode 50 on the substrate as described above, short-circuiting the anchor 11 which is in continuity with the low-resistance layer 32 of the dead-weight movable electrode 12 and the lower electrode 50 via wire 300 and setting so that the low-resistance layer 32 of the dead-weight movable electrode and the lower electrode 50 are at the same potential. Thus, the dead-weight movable electrode 12 can be securely prevented from being in contact with the substrate 30 or being attracted by electrostatic attraction.

In this embodiment the anchor 11 and the lower electrode 50 are electrified via wire 300, however, a part of the anchor 11 may be also in contact with the lower electrode via a contact hole formed through the oxide film 21 so that a process for providing wire 300 can be also omitted.

(Fifth Embodiment)

Figure 23:
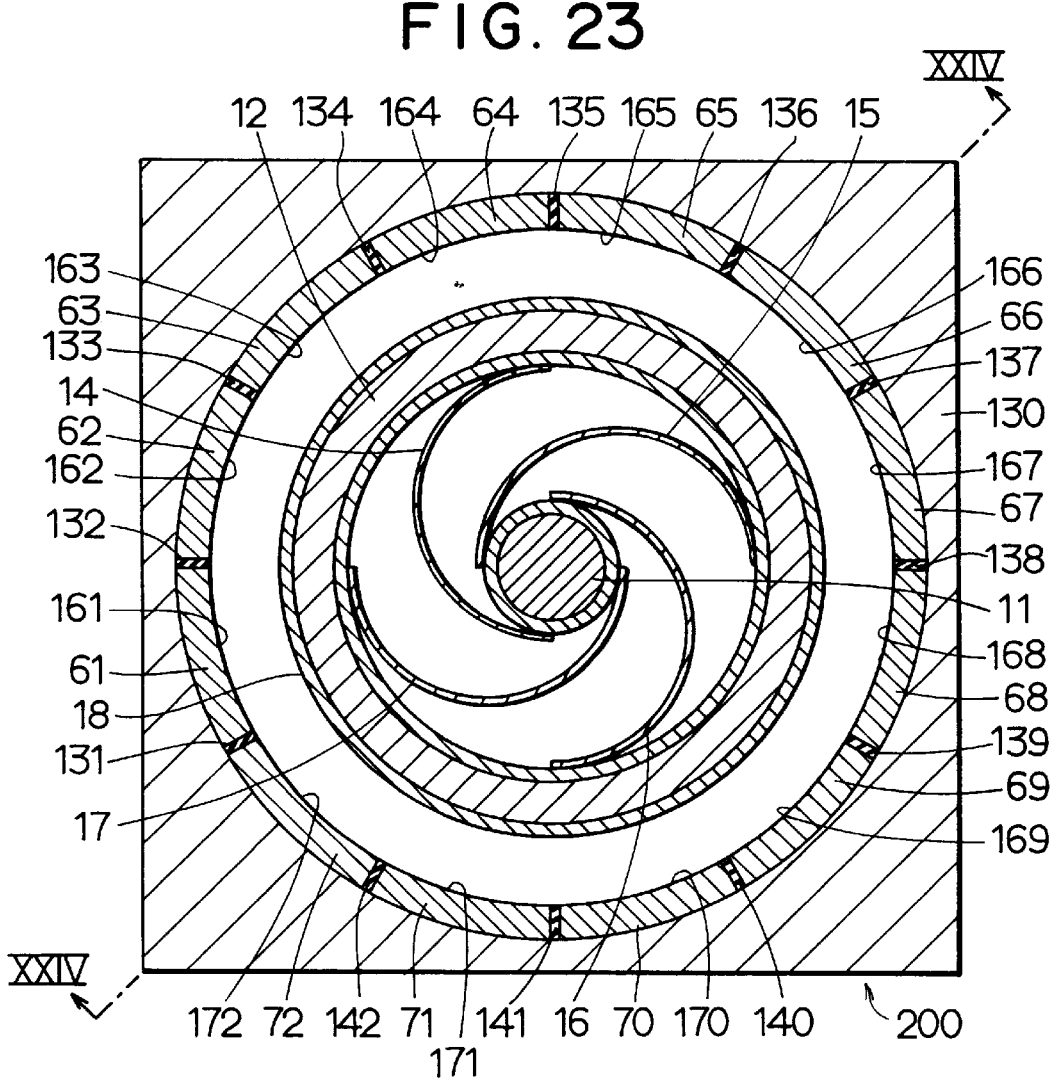
FIG. 23 is a cross section showing an acceleration sensor according to a fifth embodiment of the present invention.
Figure 24:
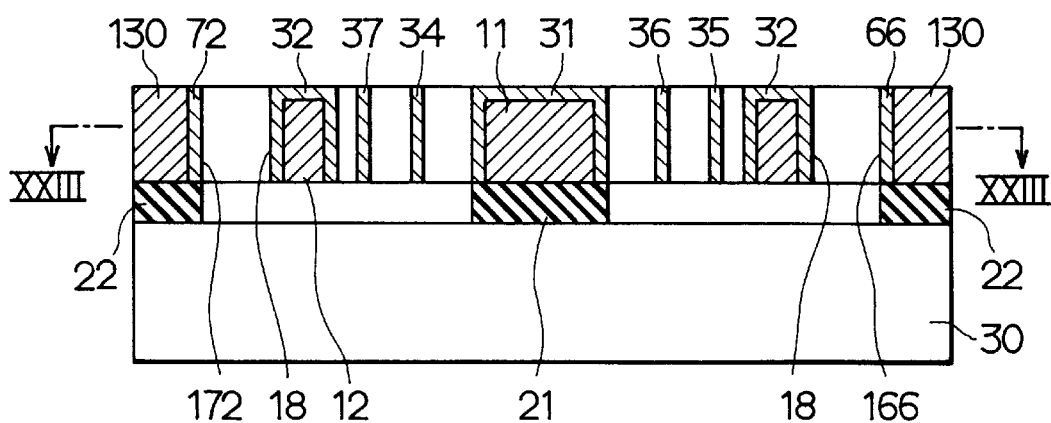
FIG. 24 is a sectional view viewed along the line XXIV—XXIV of the acceleration sensor shown in FIG. 23.

An acceleration sensor shown in FIGS. 23 and 24 is a capacitance type acceleration sensor 200 constructed by an anchor 11, a dead-weight movable electrode 12, beams 14 to 17 respectively as shown in FIG. 1 and a fixed electrode 130 consisting of divided fixed electrodes 61 to 72.

Divided fixed electrodes 61 to 72 divided in twelve uniformly are formed on the inner face of the fixed electrode 130 as shown in FIG. 23 and insulating layers 131 to 142 for insulating each divided fixed electrodes 61 to 72 are formed between adjacent divided fixed electrodes of 61 to 72.

Impurities are doped into the respective surfaces of the anchor 11, the beams 14 to 17, the dead-weight movable electrode 12 and the divided fixed electrodes 61 to 72 by a method such as ion implantation and the deposition of phosphorus so as to reduce the resistivity of the structure. At this time, oxide films 21 and 22 are respectively formed under the central anchor 11 and the fixed electrode 130 and are in contact with the substrate 30. Further, the cylindrical peripheral face of the dead-weight movable electrode 12 is a conductive detecting face 18 and the faces of divided fixed electrodes 61 to 72 which are opposite to the detecting face 18 of the dead-weight movable electrode are conductive detected faces 161 to 172.

Next, referring to FIGS. 25A to 25C, the operation of the capacitance type acceleration sensor will be described, in which the beams for connecting the anchor 11 and the dead-weight movable electrode 12 are omitted.

Figure 25A:
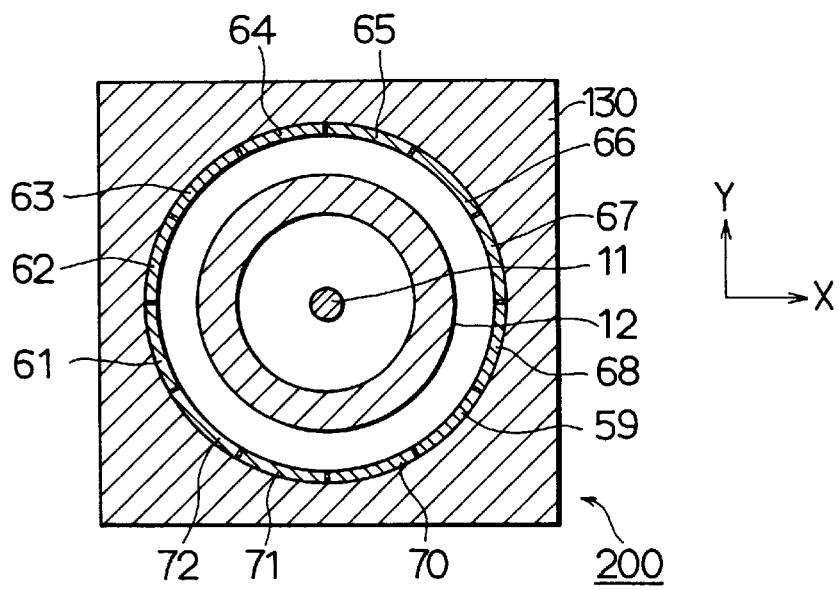
FIGS. 25A to 25C show cross sections for explaining the operation of the acceleration sensor shown in FIG. 23.

If no acceleration is applied to this sensor, the dead-weight movable electrode 12 is stationary apart from the fixed electrode 130 by a predetermined radial interval as shown in FIG. 25A.

Figure 25B:
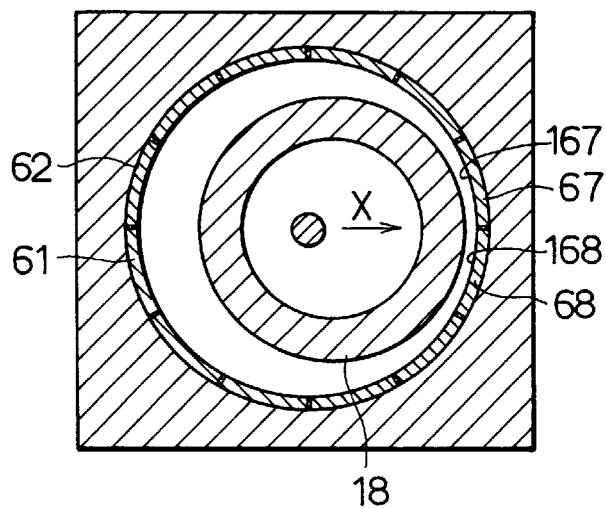

When acceleration is applied to this sensor and the dead-weight movable electrode 12 is displaced in the direction of X-axis shown in FIG. 25B, the interval between the dead-weight movable electrode 12 and each of the divided fixed electrodes 61 and 62 is widened and the interval between the dead-weight movable electrode and each of the divided fixed electrodes 67 and 68 is narrowed.

At this time, the magnitude of the direction of acceleration can be detected by measuring electrostatic capacity between the detecting face 18 of the dead-weight movable electrode and each of respective detected faces 167 and 168 of the divided fixed electrodes.

As described above, in the capacitance type acceleration sensor 200 of this embodiment, the fixed electrode 130 is divided in plural pieces and at even intervals, it can be detected in what direction and how much the dead-weight movable electrode 12 is displaced from the stationary position by detecting electrostatic capacity between the dead-weight movable electrode 12 and each of the divided fixed electrodes 61 to 72, and the magnitude and the direction of acceleration on a plane can be known.

Figure 25C:
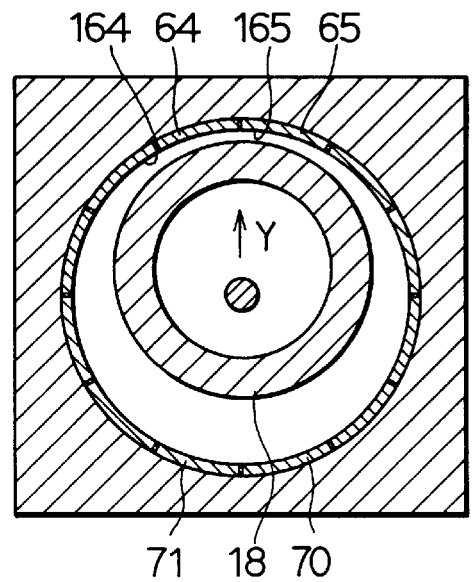

If the dead-weight movable electrode 12 is displaced in Y direction by acceleration as shown in FIG. 25C, the interval between the dead-weight movable electrode 12 and each of the fixed electrodes 70 and 71 is widened and the interval between the dead-weight movable electrode and each of fixed electrodes 64 and 65 is narrowed. Similarly at this time, the magnitude and the direction of acceleration can be detected by measuring electrostatic capacity between the detecting face 18 of the dead-weight movable electrode and each of the respective detected faces 164 and 165 of the divided fixed electrodes.

As described above, this capacitance type acceleration sensor 200 can detect the magnitude and the direction of acceleration in directions parallel to a plane constructed by X- and Y-axes.

In this embodiment, the magnitude and the direction of acceleration are detected based upon the change of electrostatic capacity between each of the divided fixed electrodes 61 to 72 and the dead-weight movable electrode 12, however, the magnitude and the direction of acceleration may be also detected based upon the contact between the detecting face 18 of the dead-weight movable electrode and each of the respective detected faces 161 to 172 of the divided fixed electrodes.

(Sixth Embodiment)

In a sixth embodiment, the fixed electrode in the second embodiment shown in FIG. 19 is divided and the divided fixed electrodes are applied to the capacitance type acceleration sensor will be described.

Figure 26:
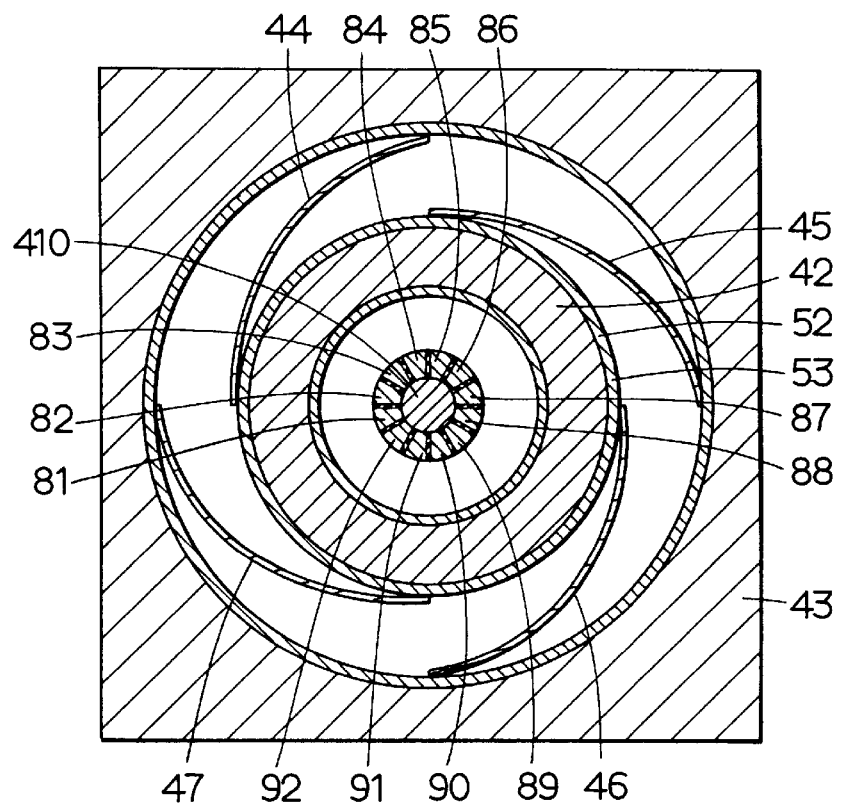
FIG. 26 is a cross section showing an acceleration sensor according to a sixth embodiment of the present invention.

An acceleration sensor shown in FIG. 26 is constructed by a cylindrical dead-weight movable electrode 42 displaced by acceleration, a cylindrical fixed electrode 410 located in the center of a substrate 30, an anchor 43 for supporting the dead-weight movable electrode 42 from the radial outside and four beams 44 to 47.

Thus, the dead-weight movable electrode 42 shown in FIG. 26 is supported by the anchor 43 located apart from outside the dead-weight movable electrode 42 by a predetermined radial interval via the four beams 44 to 47 with the dead-weight movable electrode separated upward from the substrate by a predetermined interval. The cylindrical fixed electrode 410 is arranged apart from the dead-weight movable electrode by a predetermined interval inside the dead-weight movable electrode 42. Oxide films are respectively formed under the central fixed electrode 410 and the anchor 43 and are respectively in contact with the substrate.

Similarly, impurities are doped into the respective surfaces of the anchor 43, the beams 44 to 47, the dead-weight movable electrode 42 and the fixed electrode 410 by a method such as ion implantation and the deposition of phosphorus so as to reduce the resistivity of the structure.

As shown in FIG. 26, divided fixed electrodes 81 to 92 are formed by dividing the periphery of the fixed electrode 410 in twelve uniformly and insulating layers are formed to insulate each divided fixed electrode 81 to 92.

As described above, an acceleration sensor provided with beams in the same sectional shape as in the embodiment shown in FIG. 23 and with higher sensitivity can be produced by changing the position of the fixed electrode from the outside of the cylindrical dead-weight movable electrode to the inside of it.

(Seventh Embodiment)

Figure 27:
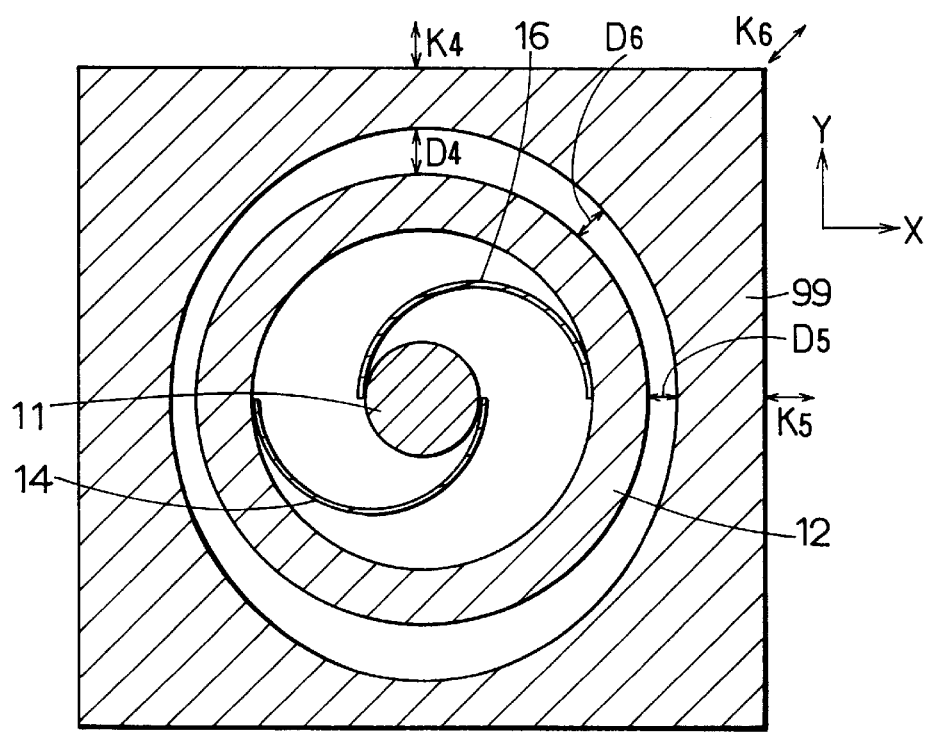
FIG. 27 is a top view showing an acceleration sensor according to a seventh embodiment of the present invention.
Figure 28:
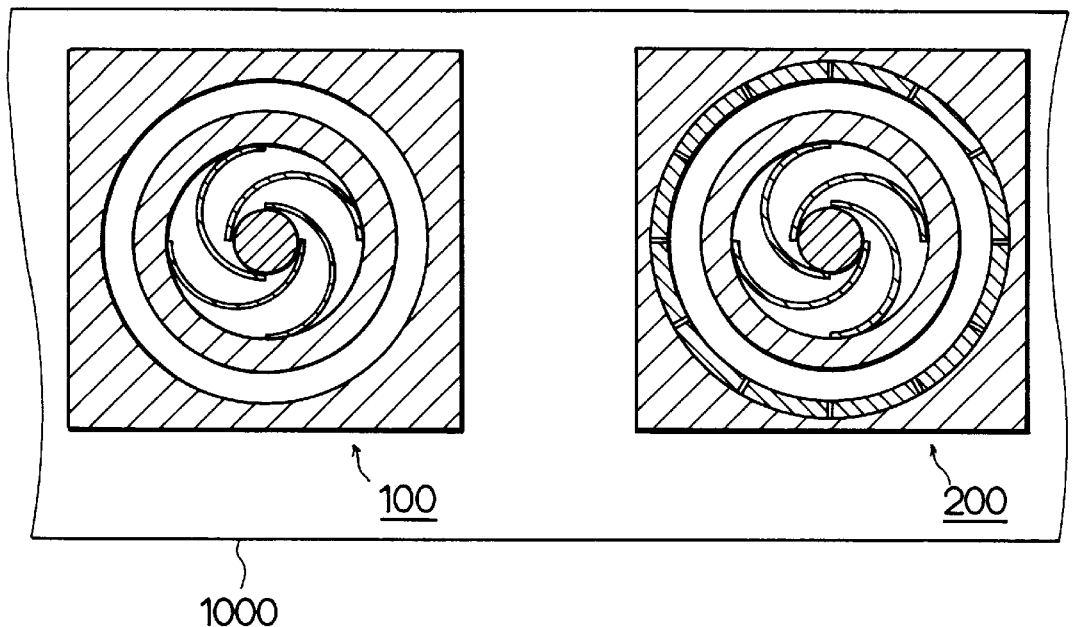
FIGS. 28 is a top view showing an acceleration sensor according to an eighth embodiment of the present invention.

An acceleration sensor shown in FIG. 27 is constructed by a cylindrical dead-weight movable electrode 12 displaced by acceleration, a fixed electrode 99 the inside of which is hollowed in an elliptic shape, an anchor 11 for supporting the dead-weight movable electrode 12 and two beams 14 and 16.

The displacement of the movable electrode on a two-directional plane can be weighed by hollowing the inside of the fixed electrode 49 in an elliptic shape as described above. For example, the dead-weight movable electrode 12 may be displaced from the center anisotropically even if the same force is applied depending upon a method of supporting the dead-weight movable electrode 12 shown in FIG. 27 by the anchor 11. It is because the elastic modulus of the beams 14 and 16 on a two-dimensional plane is not equal depending upon the shape of each beam and the positions in which the beams arranged. In this case, each beam is required to be shaped so that an interval between the fixed electrode 99 and the dead-weight movable electrode 12 is unified if the same acceleration is applied.

For example, in this embodiment, if an interval between the dead-weight movable electrode 12 and the fixed electrode 99 is respectively D4, (in the direction of Y in FIG. 27), D5 (in the direction of X) and D6 (in a diagonal direction, that is, in the direction of 45°), the total elastic modulus of the two beams 14 and 16 in the direction of each interval is respectively k4, k5 and k6 and the acceleration parallel to the substrate 30 is F, the respective intervals D4, D5 and D6 are as follows:

[Expression 5]

$$D4=F/k4$$

[Expression 6]

$$D5=F/k5$$

[Expression 7]

$$D6=F/k6.$$

The shape of the fixed electrode is determined by substituting the respective intervals D4, D5 and D6 in the expression 1.

That is, in-plane anisotropy of the output from the sensor can be eliminated by changing the shape of the fixed electrode depending upon a method in which the beams support. The shape of the fixed electrode is not limited to an ellipse, may be also calculated so that the sensitivity of the sensor is corrected on a two-dimensional plane and not only the shape of the fixed electrode but that of the dead-weight movable electrode may be also corrected. The elastic modulus in the direction of each interval is equalized and acceleration may be also detected anisotropically. That is, if the sensitivity of detecting acceleration in a specific direction is to be enhanced, the sensitivity of detection can be readily changed by adopting such structure.

(Eighth Embodiment)

An eighth embodiment is a complex sensor wherein two sensors 100 and 200 are formed on the same substrate 1000.

The sensor 100 is the switch type shown in FIG. 1 according to the first embodiment, while the sensor 200 is the capacitance type as shown in FIG. 23. First, acceleration larger than a fixed value is detected by the switch type sensor 100 and next, the capacitance type sensor 200 is operated to detect the magnitude and the direction of acceleration.

If the acceleration sensor according to this embodiment is used as the power consumption of an acceleration sensor used for a seismoscope installed in such a meter as is guaranteed for some to ten years with one battery is required to be reduced, normally the switch type sensor 100 is put in a detectable state, only if acceleration larger than a fixed value is detected by the sensor 100, the capacitance type acceleration sensor 200 is operated and therefore, the power consumption can be reduced.

As described above, as the operation of the sensor 200 is controlled by the sensor 100, the total power consumption of the sensors can be reduced and when acceleration is detected, linear output can be obtained.

As the two sensors can be formed in the same process because the sensor 100 and the sensor 200 are formed on the same substrate 1000 in this embodiment and further, the assembly of these is not required, the complex sensor can be manufactured at a low price. In this embodiment, the sensor 100 and the sensor 200 are formed on the same substrate 1000, however, they may be also formed on the different substrates.

(Ninth Embodiment)

Figure 29:
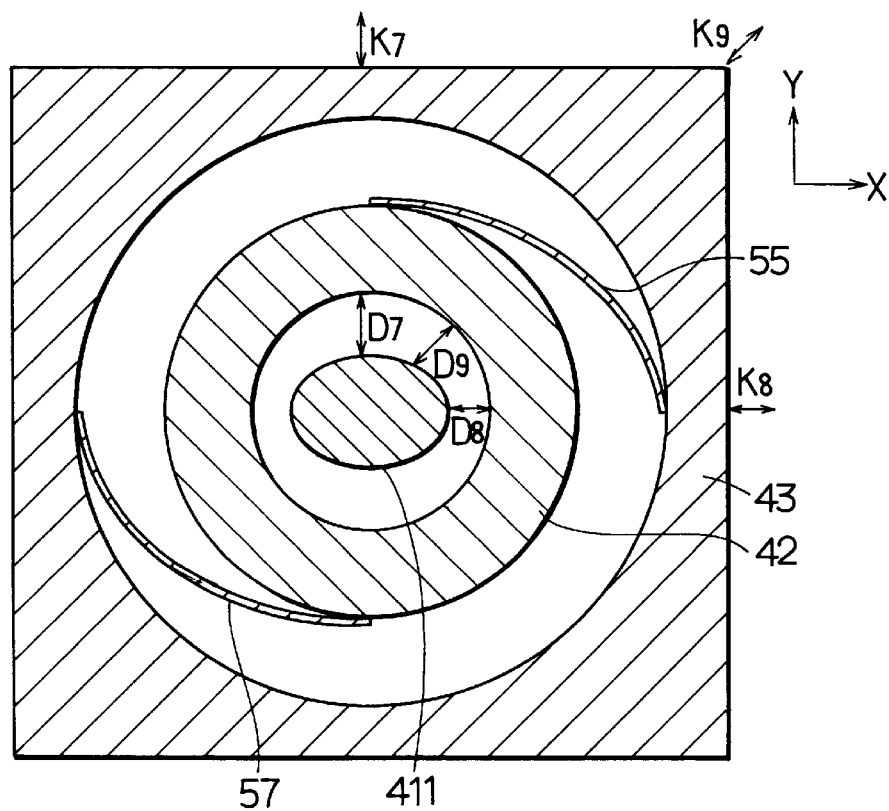
FIG. 29 is a top view showing an acceleration sensor according to a ninth embodiment of the present invention.

An acceleration sensor shown in FIG. 29 is constructed by a cylindrical dead-weight movable electrode 42 displaced by acceleration, an elliptic fixed electrode 411, an anchor 43 for supporting the dead-weight movable electrode 42 and two beams 55 and 57.

If an interval between the dead-weight movable electrode 42 and the fixed electrode 411 is respectively D7 (in the direction of Y in FIG. 29), D8 (in the direction of X) and D9 (in a diagonal direction, that is, in the direction of 45°), the total elastic modulus of two beams 55 and 57 in the direction of each interval is respectively k7, k8 and k9 and acceleration parallel to the substrate 30 is F as in FIG. 27, the respective intervals D7, D8 and D9 are as follows:

[Expression 8]

$$D7=F/k7$$

[Expression 9]

$$D8=F/k8$$

[Expression 10]

$$D9=F/k9.$$

The shape of the fixed electrode can be determined by substituting the respective intervals D7, D8 and D9 in the expression 1.

As described above, an acceleration sensor provided with beams in the same sectional shape as in the embodiment shown in FIG. 27 and with higher sensitivity can be produced by changing the position of the fixed electrode from the outside of the dead-weight movable electrode to the inside of it. The shape of the fixed electrode is not limited to an ellipse as in the embodiment shown in FIG. 27, may be also calculated so that the sensitivity of the sensor on a two-dimensional plane is corrected and not only the shape of the fixed electrode but that of the dead-weight movable electrode may be also corrected.

(Tenth Embodiment)

Figure 30:
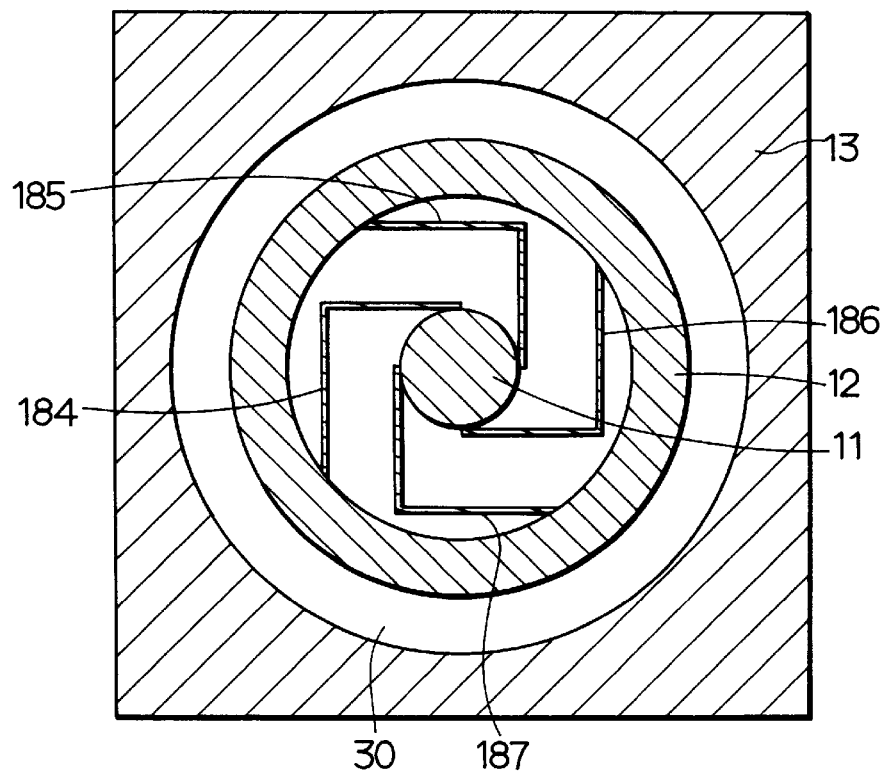
FIG. 30 is a top view showing an acceleration sensor according to a tenth embodiment of the present invention.

An acceleration sensor shown in FIG. 30 is constructed by a cylindrical dead-weight movable electrode 12 displaced by acceleration, a fixed electrode 13 the inside of which is hollowed in the shape of a cylinder, a cylindrical anchor 11 located in the center of a substrate 30 for supporting the dead-weight movable electrode 12 with elastic transformable structural material and four right-angled beams 184 to 187.

The dead-weight movable electrode 12 is supported by the beams 184 to 187 on the central anchor 11 with the dead-weight movable electrode separated upward from the substrate 30 by a predetermined interval. The fixed electrode 13 is arranged outside the cylindrical dead-weight movable electrode 12. oxide films 21 and 22 are respectively provided under the central anchor 11 and the fixed electrode 13 and are in contact with the substrate 30. As described above, if the beams 184 to 187 are in a right-angled shape, the numerical calculation of sensitivity is simplified and the design of the shape of the fixed electrode 13 is facilitated.

(Eleventh Embodiment)

Figure 31:
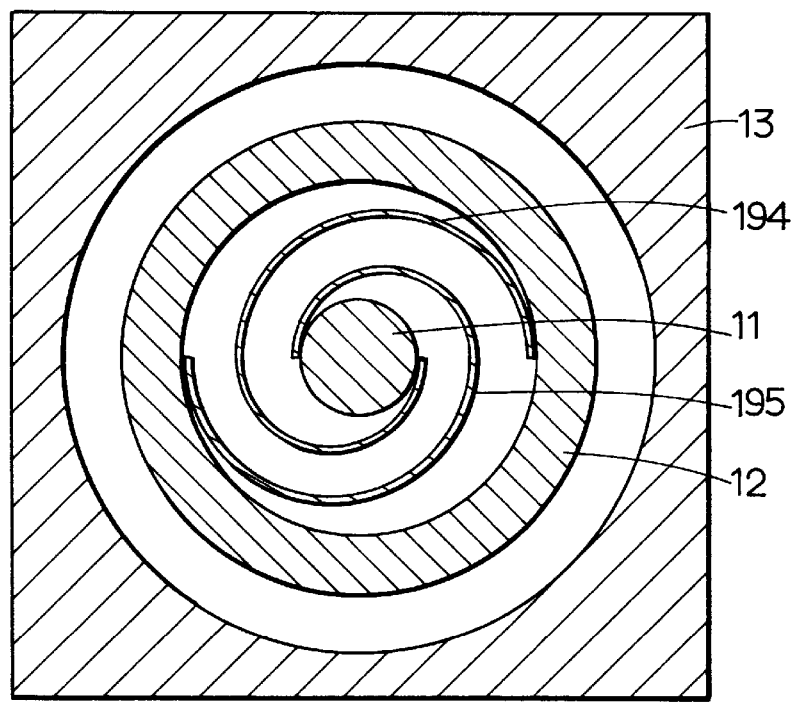
FIG. 31 is a top view showing an acceleration sensor according to an eleventh embodiment of the present invention.

An acceleration sensor shown in FIG. 31 is constructed by a cylindrical dead-weight movable electrode 12 displaced by acceleration, a fixed electrode 13 the inside of which is hollowed in the shape of a cylinder, a cylindrical anchor 11 located in the center of a substrate 30 for supporting the dead-weight movable electrode 12 with elastic transformable structural material and spiral type two beams 194 and 195. These beams are respectively in contact with the anchor 11 and the dead-weight movable electrode 12.

The dead-weight movable electrode 12 is supported by the beams 194 and 195 on the central anchor 11 with the dead-weight movable electrode separated upward from the substrate by a predetermined interval. The fixed electrode 13 is arranged outside the cylindrical dead-weight movable electrode 12. Oxide films 21 and 22 are respectively provided under the central anchor 11 and the fixed electrode 13 and are in contact with the substrate 30. As described above, if the beams 194 and 195 are spiral, the transformable quantity of each beam 194 and 195 can be increased and the concentration of stress in each beam's connection to the anchor 11 and the dead-weight movable electrode 12 can be reduced.

Regarding the dimensions of the acceleration sensor according to this embodiment, the diameter of the anchor 11 is 130 μm, the width of each beam 194 and 195 is 2 μm or more, the gap between the beams is 2 μm, the thickness of each beam 194 and 195 and the dead-weight movable electrode 12 in the direction perpendicular to the substrate is respectively 15 μm and a radial interval between the dead-weight movable electrode 12 and the fixed electrode 13 is 2 μm.

The dead-weight movable electrode 12 may be supported by the anchor 11 by any method in this embodiment, however, the design of the structure is facilitated by adopting a method of supporting without anisotropy on a two-dimensional plane. Any number of beams may be used to support the dead-weight movable electrode 12 by the anchor 11 unless the dead-weight movable electrode is twisted when it is stationary and it is desirable that two or more beams are provided in view of symmetry.

In the present invention described above, the shape of a beam is not limited to a spiral or right-angled one as long as the beam is a spring or a bellows type. Further, the material of each beam is also not limited to semiconductor material and may be also conductive material such as copper, steel and stainless steel or insulating material such as rubber, plastic and resin. The material of the dead-weight movable electrode and the fixed electrode may be also any conductive material, and the dead-weight movable electrode and the fixed electrode may be also processed not only by etching but by machining, for example dicing.

In the present invention, when acceleration is not applied, the distance between the detecting face and the detected face is kept approximately uniform, and to put the detecting face and the detected face close by approximately the same quantity as the magnitude of acceleration if the acceleration is applied from any direction approximately parallel to the surface of a substrate, the dead-weight movable electrode and the fixed electrode are respectively constructed by an approximate cylinder. However, the present invention is not limited to such construction and any construction that can detect acceleration larger than a fixed value on a plane parallel to the surface of the substrate at approximately the same sensitivity is allowed, for example either of the dead-weight movable electrode and the fixed electrode may be also formed in the shape in which a polygon is hollowed and the other electrode can be arranged in an appropriate position in the above-described electrode as a polygonal convex member. If an electrode is constructed so that acceleration in any direction on a two-dimensional plane can be detected approximately uniformly, the shape can be arbitrarily determined.

What is claimed is:

1. An acceleration sensor comprising:

a substrate;

an anchor fixedly arranged on said substrate;

a beam having one end integrated with said anchor, made of the same material as said anchor, and arranged approximately in parallel to a surface of said substrate to be elastically transformed;

a cylindrical dead-weight movable electrode integrated with said beam, made of the same material as said anchor, held over said substrate with said dead-weight movable electrode separated from said substrate by a predetermined radial interval, provided with a detecting face on an approximately cylindrical side in a direction perpendicular to said substrate, and displaceable by applied acceleration in the direction parallel to the surface of said substrate;

a fixed electrode fixedly arranged on said substrate, separated from said detecting face of said dead-weight movable electrode by a predetermined radial interval, and provided with a detected face on an approximately cylindrical side opposite to said detecting face; and detecting means for detecting said acceleration based upon the change of the distance between said detecting face of said dead-weight movable electrode and said detected face of said fixed electrode.

2. An acceleration sensor according to claim 1, wherein:

said dead-weight movable electrode includes a circular member provided with the approximately cylindrical side on the side of said fixed electrode.

3. An acceleration sensor according to claim 1, wherein:

said anchor is arranged inside said dead-weight movable electrode; and said fixed electrode is arranged outside said dead-weight movable electrode.

4. An acceleration sensor according to claim 1, wherein:

said anchor is arranged outside said dead-weight movable electrode; and said fixed electrode is arranged inside said dead-weight movable electrode.

5. An acceleration sensor according to claim 1, wherein:

the distance between said detecting face of said dead-weight movable electrode and said detected face of said fixed electrode is kept approximately uniform when said dead-weight movable electrode is kept stationary.

6. An acceleration sensor according to claim 1, wherein:

said detecting means detects a contact between said detecting face of said dead-weight movable electrode and said detected face of said fixed electrode.

7. An acceleration sensor according to claim 1, further comprising:

a projection provided on at least one face of said dead-weight movable electrode and said detecting face of said fixed electrode.

8. An acceleration sensor according to claim 7, further comprising:

means for reducing contact resistance provided on the surface of said projection.

9. A sensor according to claim 8 wherein said means for reducing contact resistance comprises a metal formed on said dead-weight movable electrode, on said projection and on said detecting face of said fixed electrode.

10. An acceleration sensor according to claim 1, wherein:
said fixed electrode includes a plurality of divided electrodes; and
said detecting means detects a change of capacity between any of said divided electrodes of said fixed electrode and said detecting face of said dead-weight movable electrode.

11. An acceleration sensor according to claim 10, further comprising:
first and second terminals connected to said detecting means and different in potential;
first wire for electrically connecting said first terminal and said fixed electrode; and
second wire for electrically connecting said second terminal and said anchor.

12. An acceleration sensor according to claim 1, wherein:
a lower electrode arranged on a surface of said substrate under said dead-weight movable electrode and set at an electric potential equal to that of said dead-weight movable electrode.

13. An acceleration sensor according to claim 1, wherein:
said fixed electrode is constructed by the same material as said anchor.

14. An acceleration sensor according to claim 1, wherein:
said anchor, said dead-weight movable electrode, said fixed electrode and said beam are formed by processing and separating an upper substrate arranged on said substrate.

15. An acceleration sensor comprising:
a first substrate;
a first anchor arranged on said first substrate;
a first beam having one end integrated with said first anchor, made of the same material as said first anchor and arranged movably approximately in parallel to the surface of said first substrate by elastic transformation;
a first cylindrical dead-weight movable electrode integrated with said first beam, made of the same material as said first anchor, held movably over said first substrate with said first dead-weight movable electrode separated from said first substrate by a first predetermined radial interval, provided with a first detecting face on an approximately cylindrical side in the direction perpendicular to said first substrate, and displaceable by applied acceleration in the direction parallel to the surface of said first substrate;
a first fixed electrode fixedly arranged on said first substrate with said first fixed electrode separated from said first detecting face of said first dead-weight movable electrode by a first interval and provided with a first detected face on an approximately cylindrical side opposite to said first detecting face;
a first detecting means for detecting said acceleration based upon a change of distance between said first detecting face of said first dead-weight movable electrode and said first detected face of said first fixed electrode;
a second substrate;
a second anchor arranged on said second substrate;
a second beam having one end integrated with said second anchor, made of the same material as said second anchor and movably arranged approximately in parallel to the surface of said second substrate by elastic transformation;
a second cylindrical dead-weight movable electrode integrated with said second beam, made of the same material as said second anchor, movably held over said second substrate with said second dead-weight movable electrode separated from said second substrate by a second predetermined radial interval, provided with a second detecting face on an approximately cylindrical side in the direction perpendicular to said second substrate and displaceable by said acceleration in the direction approximately parallel to said first dead-weight movable electrode;
a second fixed electrode fixedly arranged on said second substrate with said second fixed electrode separated from said second detecting face of said second dead-weight movable electrode by a second interval and provided with a second detected face on an approximately cylindrical side opposite to said second detecting face; and
a second detecting means for detecting said acceleration based upon a change of distance between said second detecting face of said second dead-weight movable electrode and said second detected face of said second fixed electrode after said first detecting means detects acceleration larger than said predetermined magnitude.

16. An acceleration sensor according to claim 15, wherein:
said second detecting means starts to detect the change of the distance between said second detecting face and said second detected face after said first detecting means detects acceleration larger than said predetermined magnitude.

17. An acceleration sensor according to claim 15, wherein:
said first detecting means detects the contact between said first detecting face and said first detected face.

18. An acceleration sensor according to claim 15, further comprising:
a projection provided on at least one face of said first detecting face and said first detected face.

19. An acceleration sensor according to claim 18, further comprising:
means for reducing contact resistance provided on the surface of said projection.

20. A sensor according to claim 19 wherein said means for reducing contact resistance comprises a metal formed on said dead-weight movable electrode, on said projection and on said detecting face of said fixed electrode.

21. An acceleration sensor according to claim 15, wherein:
said second fixed electrode includes a plurality of divided electrodes; and
said second detecting means detects a change of capacity between any of said divided electrodes of said second fixed electrode and said second detecting face of said second dead-weight movable electrode.

22. An acceleration sensor according to claim 15, wherein:
said first substrate and said second substrate are integrated on a single substrate; and
said material constituting said first anchor, said first beam and said first movable electrode is the same material.

23. An acceleration sensor comprising:
a semiconductor substrate;
an elastic beam member;
a cylindrical dead-weight movable electrode supported movably by said beam member over said semiconductor substrate in any direction on a plane parallel to the surface of said semiconductor substrate; and a fixed electrode fixedly arranged on said semiconductor substrate and radially separated from said dead-weight movable electrode by a predetermined radial interval, wherein an output equivalent to an applied acceleration is provided based upon a change of a radial distance between said dead-weight movable electrode and said fixed electrode; and a positional relationship between said dead-weight movable electrode and said fixed electrode is set so that approximately fixed output equivalent to a predetermined acceleration is obtained even if the predetermined acceleration operates on said dead-weight movable electrode from any direction on a plane parallel to the surface of said semiconductor substrate.

24. An acceleration sensor comprising:

a substrate;

an anchor fixedly arranged on said substrate;

a plurality of beams, each beam having one end integrated with said anchor, made of the same material as said anchor, and arranged approximately in parallel to a surface of said substrate to be elastically transformed;

a cylindrical dead-weight movable electrode integrated with said beams, made of the same material as said anchor, held over said substrate with said dead-weight movable electrode separated from said substrate by a predetermined radial interval, provided with a detecting face on an approximately cylindrical side in a direction perpendicular to said substrate, and displaceable by applied acceleration in the direction parallel to the surface of said substrate;

a fixed electrode fixedly arranged on said substrate, separated from said detecting face of said dead-weight movable electrode by a predetermined radial interval, and provided with a detected face on an approximately cylindrical side opposite to said detecting face; and detecting means for detecting said acceleration based upon the change of the distance between said detecting face of said dead-weight movable electrode and said detected face of said fixed electrode.

25. An acceleration sensor according to claim 24, wherein:

said dead-weight movable electrode includes a circular member provided with the approximately cylindrical side on the side of said fixed electrode.

26. An acceleration sensor according to claim 24, wherein:

said anchor is arranged inside said dead-weight movable electrode; and said fixed electrode is arranged outside said dead-weight movable electrode.

27. An acceleration sensor according to claim 24, wherein:

said anchor is arranged outside said dead-weight movable electrode; and said fixed electrode is arranged inside said dead-weight movable electrode.

28. An acceleration sensor according to claim 24, wherein:

the distance between said detecting face of said dead-weight movable electrode and said detected face of said fixed electrode is kept approximately uniform when said dead-weight movable electrode is kept stationary.

29. An acceleration sensor according to claim 24, wherein:

said detecting means detects a contact between said detecting face of said dead-weight movable electrode and said detected face of said fixed electrode.

30. An acceleration sensor according to claim 24, further comprising:

a projection provided on at least one face of said dead-weight movable electrode and said detecting face of said fixed electrode.

31. An acceleration sensor according to claim 30, further comprising:

a member for reducing contact resistance provided on the surface of said projection.

32. A sensor according to claim 31 wherein said member for reducing contact resistance comprises a metal formed on said dead-weight movable electrode, on said projection and on said detecting face of said fixed electrode.

33. A sensor according to claim 31 wherein said member for reducing contact resistance comprises a metal formed on said dead-weight movable electrode, on said projection and on said detecting face of said fixed electrode.

34. An acceleration sensor according to claim 24, wherein:

said fixed electrode includes a plurality of divided electrodes; and said detecting means detects a change of capacity between any of said divided electrodes of said fixed electrode and said detecting face of said dead-weight movable electrode.

35. An acceleration sensor according to claim 34, further comprising:

first and second terminals connected to said detecting means and different in potential;

first wire for electrically connecting said first terminal and said fixed electrode; and second wire for electrically connecting said second terminal and said anchor.

36. An acceleration sensor according to claim 24, wherein:

a lower electrode arranged on a surface of said substrate under said dead-weight movable electrode and set at an electric potential equal to that of said dead-weight movable electrode.

37. An acceleration sensor according to claim 24, wherein:

said fixed electrode is constructed by the same material as said anchor.

38. An acceleration sensor according to claim 24, wherein:

said anchor, said dead-weight movable electrode, said fixed electrode and said beams are formed by processing and separating an upper substrate arranged on said substrate.

39. An acceleration sensor according to claim 24, wherein:

said plurality of beams are provided at plural locations; and, when the total elastic modulus in a first direction parallel to said substrate of said plurality of beams is a first elastic modulus and the total elastic modulus in a second direction which is parallel to said substrate and different from the first direction of said plurality beams is a second elastic modulus, a first distance in said first direction and a second distance in said second direction between said detecting face and said detected face when said acceleration is not applied to said dead-weight movable electrode are set so that they satisfy the following expression:

(first elastic modulus)×(first distance)=(second elastic modulus)× (second distance).

40. An acceleration sensor comprising:

a first substrate;

a first anchor arranged on said first substrate;

a first plurality of beams, each beam having one end integrated with said first anchor, made of the same material as said first anchor and arranged movably approximately in parallel to the surface of said first substrate by elastic transformation;

a first cylindrical dead-weight movable electrode integrated with said first plurality of beams, made of the same material as said first anchor, held movably over said first substrate with said first dead-weight movable electrode separated from said first substrate by a first predetermined radial interval, provided with a first detecting face on an approximately cylindrical side in the direction perpendicular to said first substrate, and displaceable by applied acceleration in the direction parallel to the surface of said first substrate;

a first fixed electrode fixedly arranged on said first substrate with said first fixed electrode separated from said first detecting face of said first dead-weight movable electrode by a first interval and provided with a first detected face on an approximately cylindrical side opposite to said first detecting face;

a first detecting means for detecting said acceleration based upon a change of distance between said first detecting face of said first dead-weight movable electrode and said first detected face of said first fixed electrode;

a second substrate;

a second anchor arranged on said second substrate;

a second plurality of beams, each beam having one end integrated with said second anchor, made of the same material as said second anchor and movably arranged approximately in parallel to the surface of said second substrate by elastic transformation;

a second cylindrical dead-weight movable electrode integrated with said second plurality of beams, made of the same material as said second anchor, movably held over said second substrate with said second dead-weight movable electrode separated from said second substrate by a second predetermined radial interval, provided with a second detecting face on an approximately cylindrical side in the direction perpendicular to said second substrate and displaceable by said acceleration in the direction approximately parallel to said first dead-weight movable electrode;

a second fixed electrode fixedly arranged on said second substrate with said second fixed electrode separated from said second detecting face of said second dead-weight movable electrode by a second interval and provided with a second detected face on an approximately cylindrical side opposite to said second detecting face; and a second detecting means for detecting said acceleration based upon a change of distance between said second detecting face of said second dead-weight movable electrode and said second detected face of said second fixed electrode after said first detecting means detects acceleration larger than said predetermined magnitude.

41. An acceleration sensor according to claim 40, wherein:

said second detecting means starts to detect the change of the distance between said second detecting face and said second detected face after said first detecting means detects acceleration larger than said predetermined magnitude.

42. An acceleration sensor according to claim 40, wherein:

said first detecting means detects the contact between said first detecting face and said first detected face.

43. An acceleration sensor according to claim 40, further comprising:

a projection provided on at least one face of said first detecting face and said first detected face.

44. An acceleration sensor according to claim 43, further comprising:

a member for reducing contact resistance provided on the surface of said projection.

45. A sensor according to claim 44 wherein said member for reducing contact resistance comprises a metal formed on said dead-weight movable electrode, on said projection and on said detecting face of said fixed electrode.

46. A sensor according to claim 44 wherein said member for reducing contact resistance comprises a metal formed on said dead-weight movable electrode, on said projection and on said detecting face of said fixed electrode.

47. An acceleration sensor according to claim 40, wherein:

said second fixed electrode includes a plurality of divided electrodes; and said second detecting means detects a change of capacity between any of said divided electrodes of said second fixed electrode and said second detecting face of said second dead-weight movable electrode.

48. An acceleration sensor according to claim 40, wherein:

said first substrate and said second substrate are integrated on a single substrate; and said material constituting said first anchor, said first plurality of beams and said first movable electrode is the same material.

* * * * *